(12) United States Patent
Soffer

(10) Patent No.: US 11,606,460 B2
(45) Date of Patent: Mar. 14, 2023

(54) MUTUAL DISABLING UNIT FOR MULTIPLE PHONES

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 50 days.

(21) Appl. No.: 17/224,157

(22) Filed: Apr. 7, 2021

(65) Prior Publication Data

US 2022/0329688 A1 Oct. 13, 2022

(51) Int. Cl.
*H04M 3/20* (2006.01)
*H04M 7/00* (2006.01)

(52) U.S. Cl.
CPC .......... *H04M 3/205* (2013.01); *H04M 7/006* (2013.01)

(58) Field of Classification Search
CPC ............................. H04M 3/205; H04M 7/006
USPC ........................................................ 370/259
See application file for complete search history.

(56) References Cited

U.S. PATENT DOCUMENTS

| | | | |
|---|---|---|---|
| 3,715,514 A | 2/1973 | Bell | |
| 4,942,605 A * | 7/1990 | McClain | H04M 1/19 379/433.06 |
| 5,664,008 A | 9/1997 | Bossi et al. | |
| 5,754,628 A | 6/1998 | Bossi et al. | |
| 5,832,075 A | 11/1998 | Gancarcik et al. | |
| 6,725,045 B2 * | 4/2004 | Oren | H04M 3/42229 455/445 |
| 7,660,575 B2 | 2/2010 | Yeap et al. | |
| 7,808,974 B2 | 10/2010 | Ying et al. | |
| 8,195,958 B2 | 6/2012 | Fries | |
| 8,789,141 B2 | 7/2014 | Chin et al. | |
| 8,988,532 B2 | 3/2015 | Soffer | |
| 9,158,496 B2 | 10/2015 | Soffer | |
| 10,194,011 B2 | 1/2019 | Soffer | |
| 10,595,400 B1 * | 3/2020 | Razaghi | H05K 1/0275 |
| 11,272,141 B2 * | 3/2022 | Welch | G06F 3/165 |
| 11,363,134 B2 * | 6/2022 | Bouvet | H04L 65/104 |
| 2004/0133772 A1 * | 7/2004 | Render | H04L 63/0227 713/150 |
| 2008/0080703 A1 | 4/2008 | Randall et al. | |
| 2010/0316214 A1 * | 12/2010 | Hung | H04M 1/745 379/412 |
| 2011/0208963 A1 | 8/2011 | Soffer | |
| 2011/0261810 A1 * | 10/2011 | Trovel | H04L 65/1104 370/352 |
| 2013/0242858 A1 | 9/2013 | Amine | |
| 2014/0015673 A1 * | 1/2014 | Soffer | G06F 13/4068 340/568.1 |

(Continued)

FOREIGN PATENT DOCUMENTS

CA 2546743 4/2011

*Primary Examiner* — Binh Kien Tieu
(74) *Attorney, Agent, or Firm* — Alphapatent Associates, Ltd; Daniel J. Swirsky

(57) ABSTRACT

A secure phone system comprising a plurality of Voice over IP (VoIP) phones, each having an enhanced security implant device, a Mutual Disabling Unit (MDU) and a method of operating the system for securing VoIP phones located in the same room by disabling a VoIP phone while a call is active in another phone in order to prevent audio eavesdropping.

20 Claims, 28 Drawing Sheets

(56) References Cited

U.S. PATENT DOCUMENTS

2018/0091639 A1* 3/2018 Soffer ................ H04M 1/2535
2019/0394327 A1* 12/2019 Bouvet .................. H04M 1/82

* cited by examiner

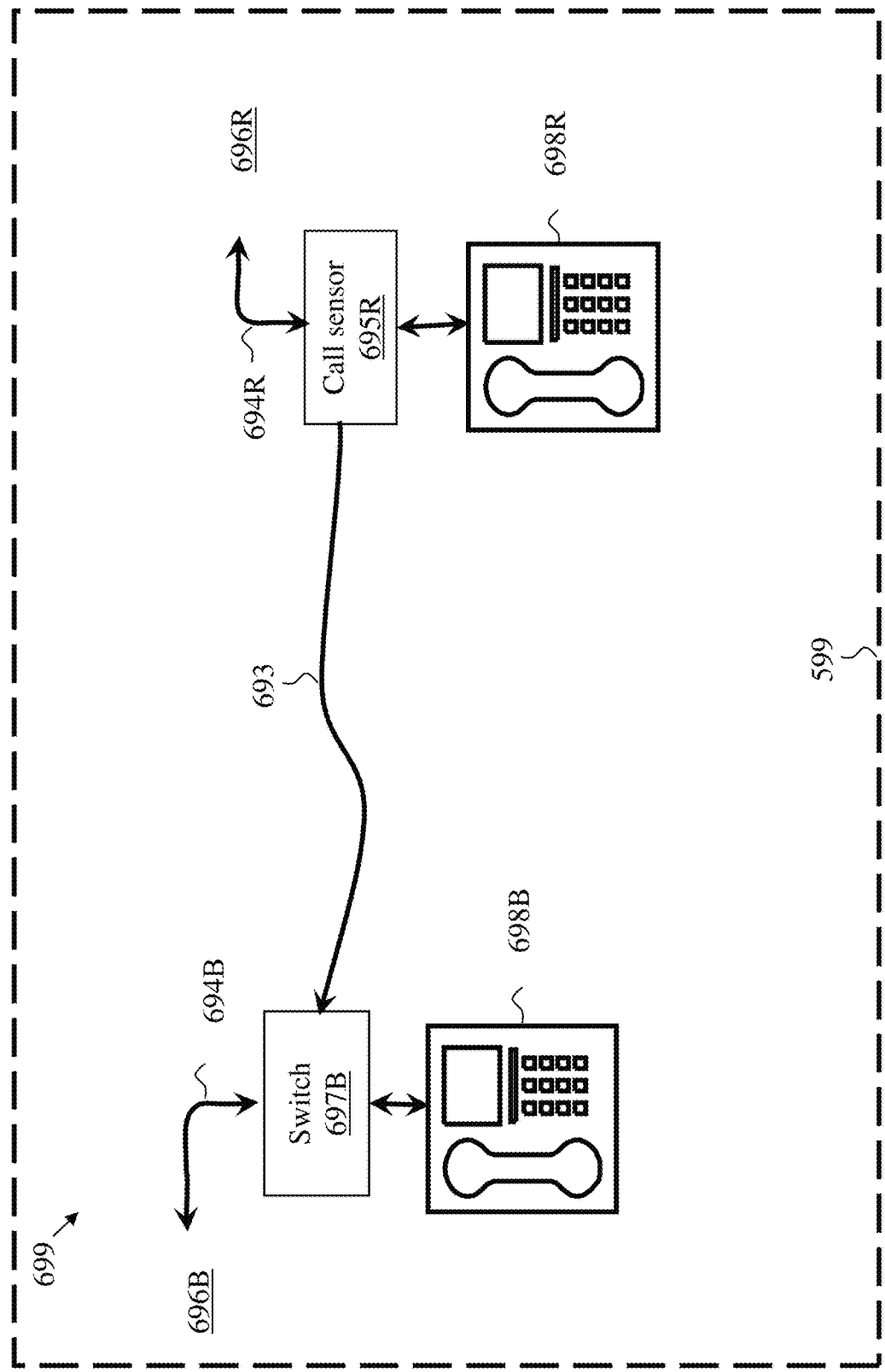
Figure 6A (red and black phones)

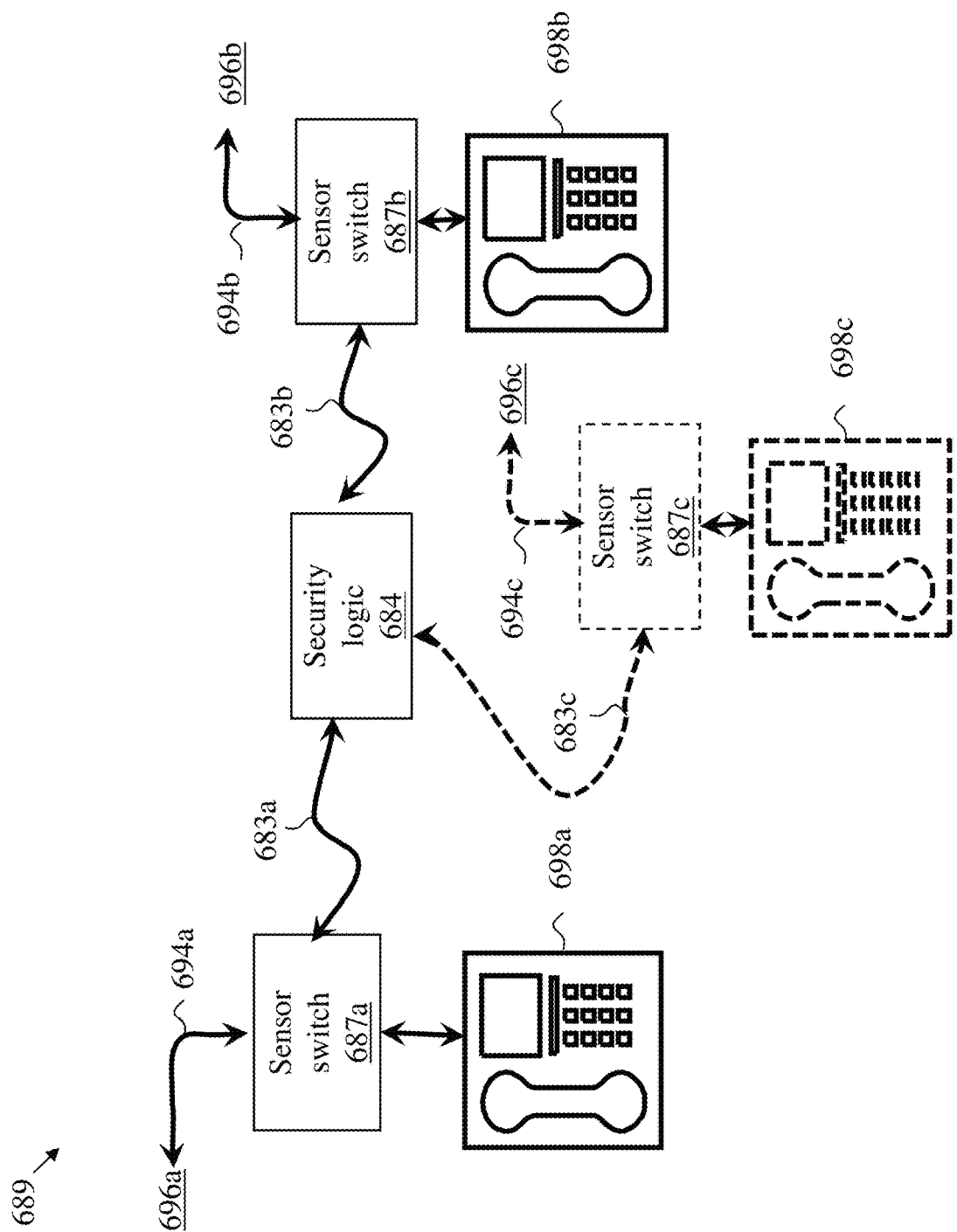
Figure 6B (simple dongle, simple phones)

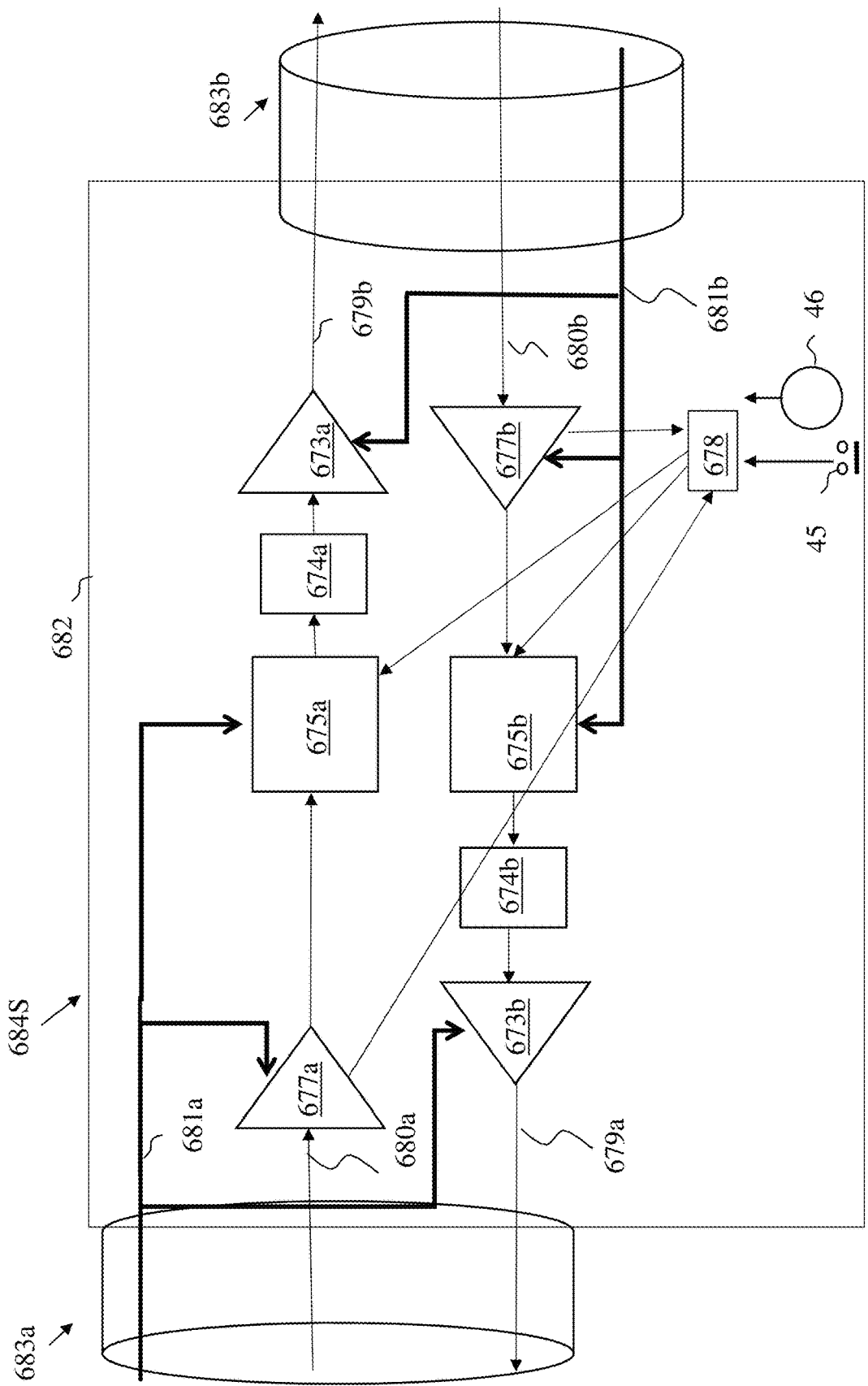

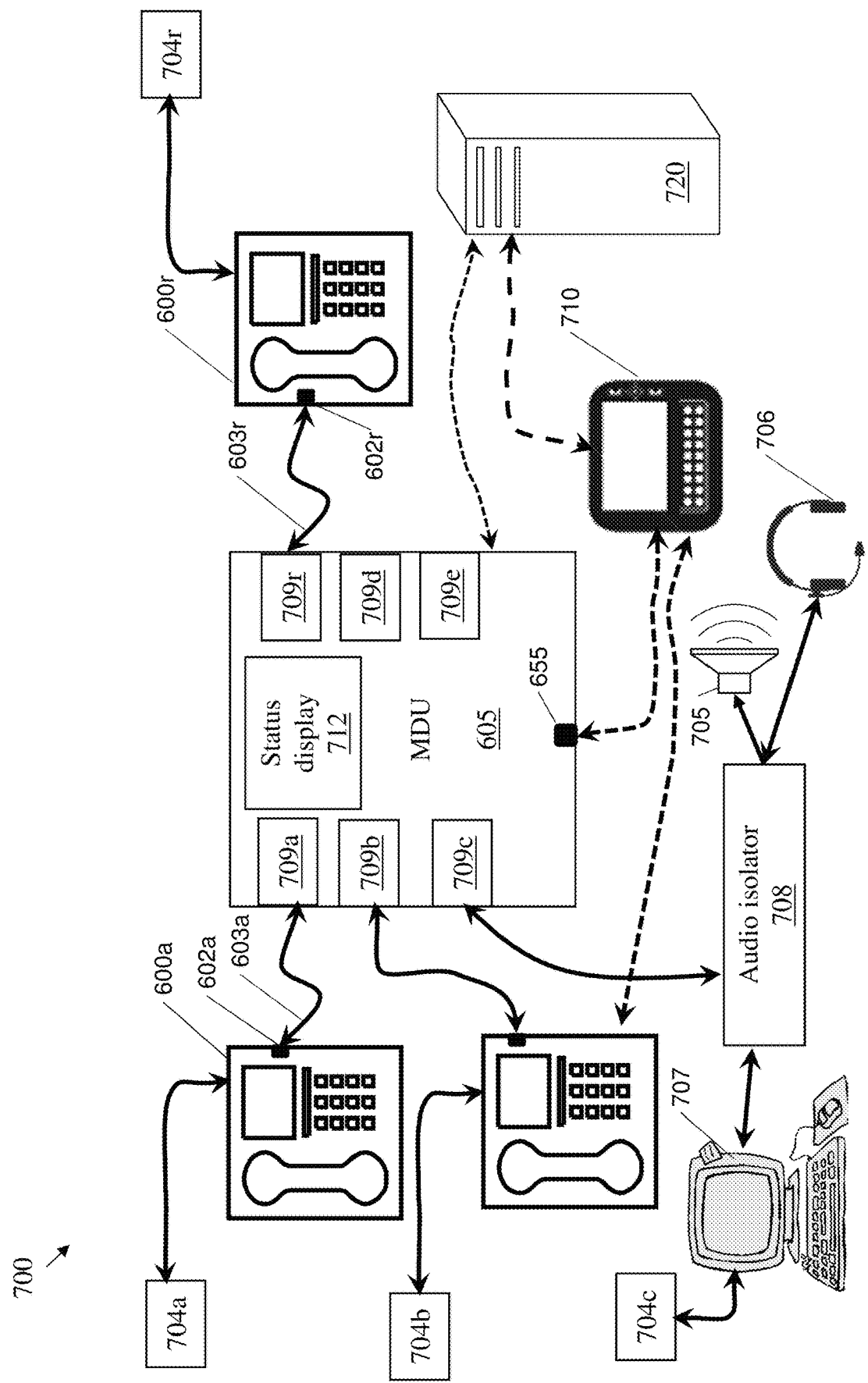
Figure 7A (VoIP secure system block diagram)

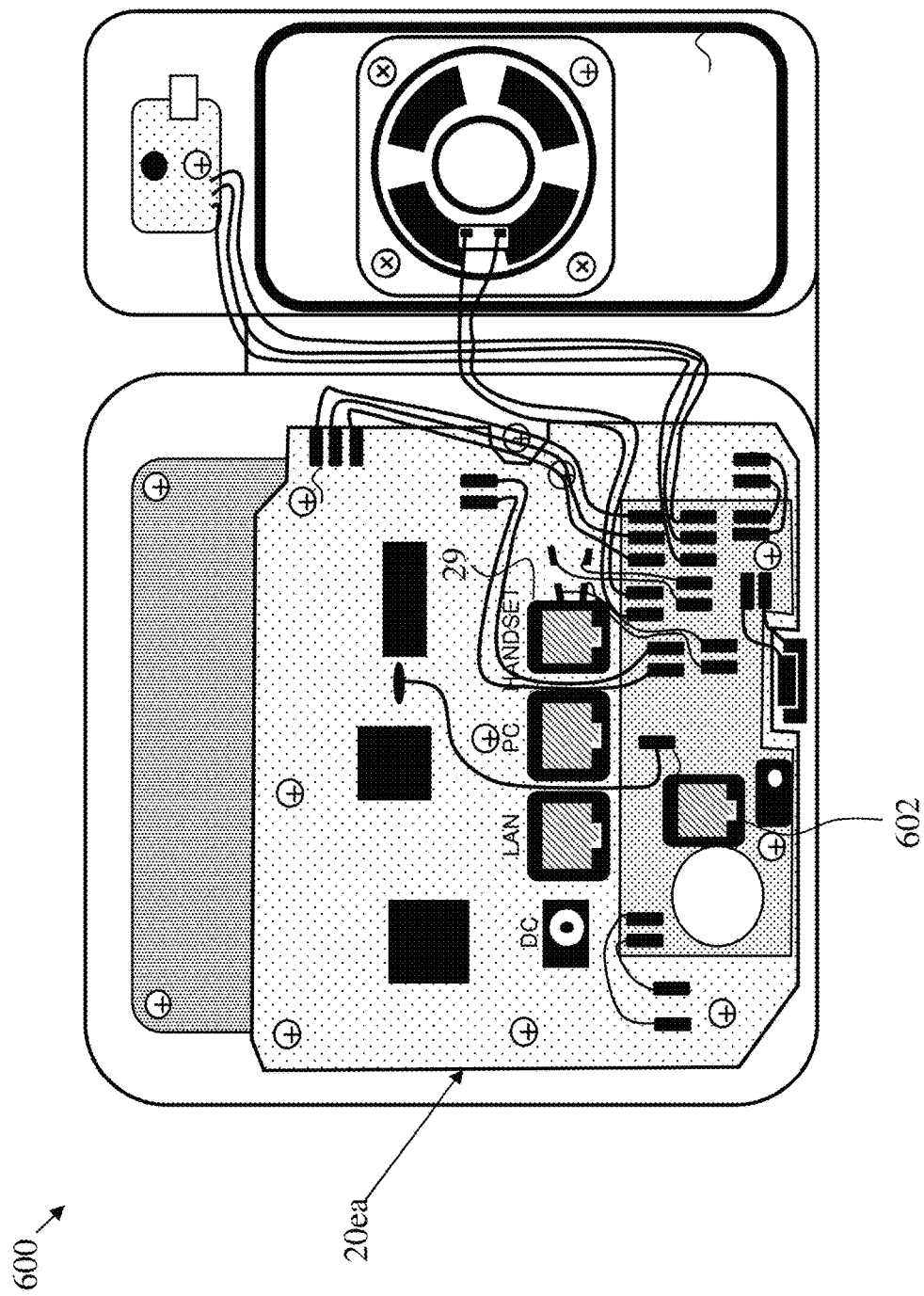
Figure 7B (connectors of implant)

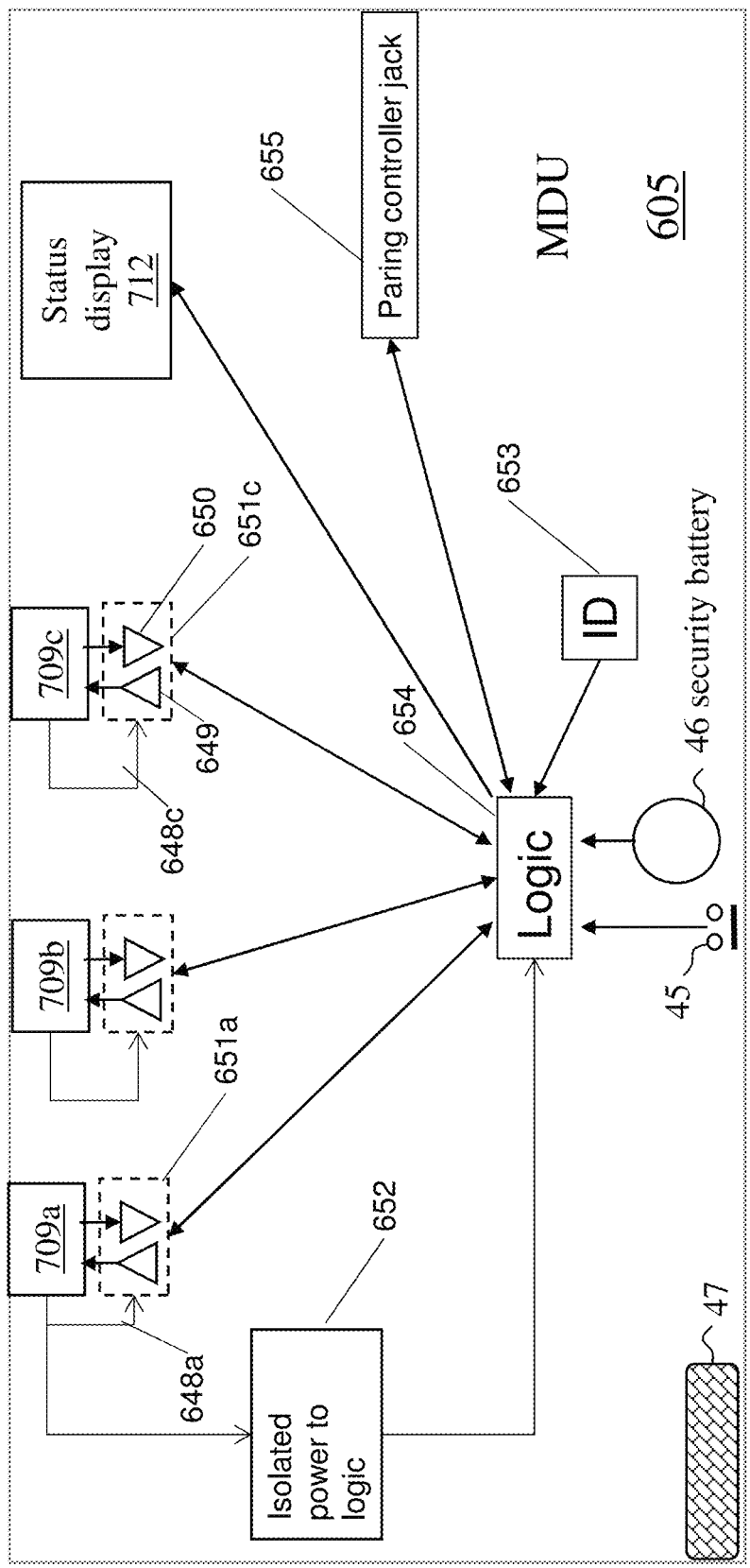
Figure 9 – Dongle block diagram (with paring etc.)

MDU – Devices pairing without programming

1. Connect device No.1 to Red MDU port
   optional- device No.1 identified and verified by MDU
2. Connect device No.2 to Black MDU port
   optional- device No.2 identified and verified by MDU
3. Set MDU to operational state Figure 10A – paring without programming

MDU – audio devices pairing and programming

1. Connect MDU to pairing and programming device MDU identified and verified by pairing device.
2. Connect audio device No.1 to MDU. device No.1 identified and verified by pairing device.
3. Pair device No.1 with MDU. Optionally: set priority; set group.
4. Connect audio device No.1 with MDU.
5. Disconnect audio device No.1 from pairing.
6. Repeat #1-5 for all audio devices
7. End paring: set MDU to operational state.
8. Disconnect pairing device from MDU.
9. Optional – log a report on Server.

Figure 10B (MDU – Devices pairing and programming)

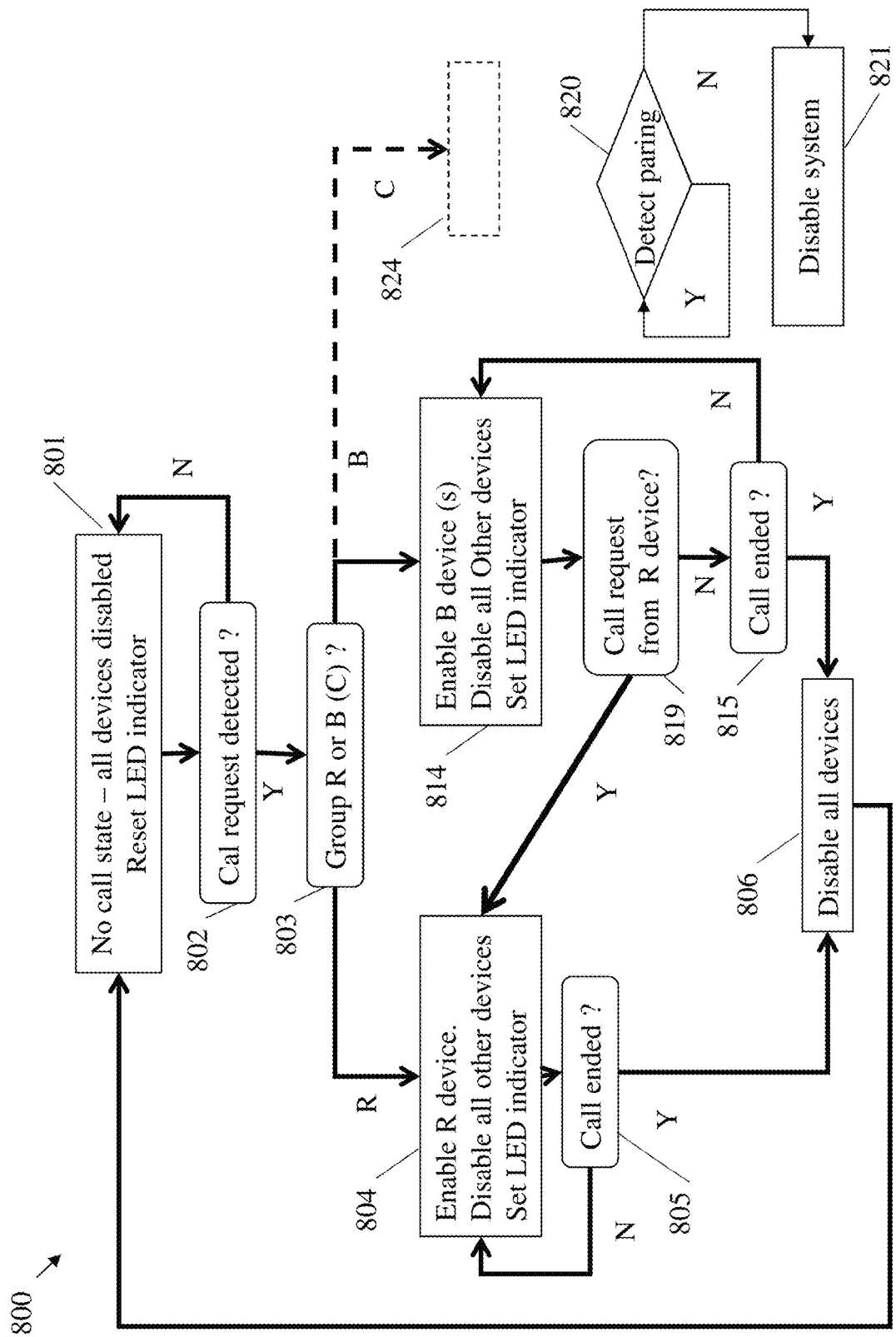
Figure 11A (MDU operation)

MUTUAL DISABLING UNIT FOR MULTIPLE PHONES

FIELD

The present invention relates to a method and apparatus that enhances the security of Voice over Internet Protocol (VoIP) telephony devices. More specifically the present invention relates to a security implant that embedded inside a standard, non-secure VoIP telephone device in order to prevent remote attacker from exploiting the device to listen to surrounding classified conversations. Unlike prior art VoIP phone security methods that encrypt and protect the call and call related data, the method and apparatus of the present invention is intended to protect the phone device itself from being hacked.

BACKGROUND

Since the 1980's, many organizations are shifting from the analog telephony (also called PSTN—public switched telephone network) into newer Voice over IP telephony. As VoIP telephony gained more popularity, production volumes increased, and cost reduced. Competitive market conditions together with technological development assisted further VoIP cost reduction to a level that is similar or even lower than the older less capable PSTN telephony.

During the last decades, VoIP telephony became the industry standard for any small to large organization building a new system or retrofitting older PSTN system. Among the reason that VoIP gained so much popularity over PSTN telephony are:
1. Better call quality.
2. Higher system reliability.
3. Long list of value-added features such as: conference call, caller ID, phone directory, voice mail, email, call forwarding etc.
4. Low call cost (or even zero cost) on domestic and international calls.
5. Sharing the same physical infrastructure as computer network that already deployed.

For many organizations, the economical drive towards the transition from PSTN to VoIP telephony is strong, but still for many organizations there is an additional factor that delay or even stop this transition. This factor is security. It is well accepted that VoIP telephony is having a long list of inherent security vulnerabilities compared to PSTN.

Few dominant security vulnerabilities are:
1. Call being tapped and transmitted to a remote attacker;
2. Call information being transmitted to a remote attacker;
3. Phone handset or base microphone are activated by a remote attacker to enable audio eavesdropping at the vicinity of the phone;
4. Phone handset earphone element or base speaker are being exploited while user is unaware to enable audio eavesdropping at the vicinity of the phone;
5. Phone firmware stored on non-volatile memory or software running on volatile memory is being modified by a remote attacker in order to enable unsecure operations;
6. Phone having physical (for example implant) or software tampering due to supply-chain vulnerability.

Some security efforts of the art concentrated on software based solution, such as, encrypting the voice data to prevent intercepting and decoding the call while the data is traveling in the Internet.

WO 2018/060995 international patent application; to Aviv Soffer, entitled "METHOD AND APPARATUS FOR SECURING VOICE OVER IP TELEPHONE DEVICE"; discloses a hardware implant on the VoIP terminal, i.e. the VoIP phone, to disables audio input and output components of the Vo IP phone in order to prevent audio eavesdropping.

SUMMARY

The present invention provides a security system for preventing eavesdropping for a group of phones, e.g., in phones in the same room.

According to an aspect of the present disclosed subject matter, a secure phone system comprising: a plurality of Voice over IP (VoIP) phones, each having an enhanced security implant device; and a Mutual Disabling Unit (MDU) connected to each of the enhanced security implant device in each of the VoIP phones, wherein the MDU is capable of disabling the operation of at least one VoIP phone while a call is active in another VoIP phone, in order to prevent audio eavesdropping.

In some exemplary embodiments the MDU comprising a controller that is configured to pair and authenticate with the VoIP phones.

In some exemplary embodiments the MDU comprising one of or any combination of (1) digital logic, (2) Complex Programmable Logic Device (CPLD), (3) Application Specific Integrated Circuit (ASIC), (4) Field-Programmable Gate Array (FPGA), (5) micro-controller, and (5) micro-processor.

In some exemplary embodiments the MDU further comprising a tampering detector configured to detect attempt to tamper with the MDU, and permanently disabling the phones through the sensor-switch devices once a tampering attempt was detected.

In some exemplary embodiments the VoIP phone comprises a base microphone and the security implant comprises an audio switch for connecting the base microphone to the VoIP phone's non-secure hardware only during active phone call.

In some exemplary embodiments the VoIP phone comprises a base speaker, and the security implant comprises an audio switch to disable the base speaker when not in use.

In some exemplary embodiments the VoIP phone comprises a handset microphone, and the security implant comprises an audio switch to disable the microphone in the handset when the handset off-on hook switch is in on-hook state.

In some exemplary embodiments the VoIP phone comprises a handset speaker, and the security implant comprises an audio switch to disable the handset speaker when not in use.

In some exemplary embodiments the security implant for a VoIP phone device comprises audio diodes between the audio amplifiers and speakers or earphones of the VoIP phone device to prevent audio eavesdropping through the speakers or earphones.

According to an aspect of the present disclosed subject matter a secure phone system comprising: a plurality of phones, each connected to a corresponding phone line through a sensor-switch device capable of: sensing a call in progress on the corresponding phone line; and connecting and disconnecting the corresponding phone from the corresponding phone line; and a Mutual Disabling Unit (MDU) connected to each of the sensor-switch device, wherein the MUD is capable of causing at least one of the sensor-switch device to disconnect the corresponding phone from the corresponding phone line while a call is active in another phone, in order to prevent audio eavesdropping.

In some exemplary embodiments the secure phone system of claim 0, wherein the MDU comprising one of or any combination of (1) digital logic, (2) Complex Programmable Logic Device (CPLD), (3) Application Specific Integrated Circuit (ASIC), (4) Field-Programmable Gate Array (FPGA), (5) micro-controller, and (5) micro-processor.

In some exemplary embodiments the sensor-switch device transmits a call request status signal, and receives an enable/disable control signal.

In some exemplary embodiments the MDU further comprising a tampering detector configured to detect attempt to tamper with the MDU, and permanently disabling the phones through the sensor-switch devices once a tampering attempt was detected.

In some exemplary embodiments the MDU blocks concurrent calls in the plurality of phones.

According to an aspect of the present disclosed subject matter a VoIP phone device comprising a command port, wherein upon receiving disable command over the command port, the VoIP phone mute the audio operations to prevent audio eavesdropping.

According to an aspect of the present disclosed subject matter an enhanced security implant for a VoIP phone device comprising a command port, wherein upon receiving disable command over the command port, the implant for the VoIP phone force a mute of the audio operations to prevent audio eavesdropping.

In some exemplary embodiments the security implant for a VoIP phone device comprises an audio switch to disable base microphone, base speaker, handset microphone and handset speaker.

In some exemplary embodiments the security implant for a VoIP phone device comprises audio diodes between the audio amplifiers and speakers or earphones of the VoIP phone device to prevent audio eavesdropping through the speakers or earphones.

According to an aspect of the present disclosed subject matter a method for securing a phone system comprising a group of phones, the group of phones is divided to subgroups of phones and each subgroup is assigned with a priority, the method comprises the steps: (1) disable all phones; (2) detect call request event in any one of the group of phones, (3) if no call is in progress in any other phone in the group of phones, enable the phone and disable all other phones in the group of phones; (4) if another call is in progress and the call request is associated to phone with higher priority, enable the higher priority phone and disable the lower priority phone; (5) wait for call end; and (6) jump back to step 1, wherein, enabling the phone allows the call and pass the audio operations and disabling the phone mute the audio operations to prevent audio eavesdropping.

In some exemplary embodiments the system is deployed on the central call routing facility of an entity and the system manage a plurality of the group of phones comprising each a plurality of the subgroups of phones.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6A schematically illustrates a system for mutually excluding call in plain phones in accordance with some exemplary embodiments of the disclosed subject matter;

FIG. 6B schematically illustrates a system for mutually excluding call in plain phones, in accordance with some exemplary embodiments of the disclosed subject matter;

FIG. 6C schematically illustrates a simple security unit, in accordance with some exemplary embodiments of the disclosed subject matter;

FIG. 7A schematically illustrates a secure VoIP system, in accordance with some exemplary embodiments of the disclosed subject matter;

FIG. 7B schematically illustrates a rear-view of a VoIP phone with cover removed to expose the internal physical layout, showing the additional command port, in accordance with some exemplary embodiments of the disclosed subject matter;

FIG. 9 schematically illustrates a block diagram of a Mutual Disabling Unit (MDU), in accordance with some exemplary embodiments of the disclosed subject matter;

FIG. 10A illustrates the process of pairing without programming of the Mutual Disabling Unit (MDU) and audio devices, in accordance with some exemplary embodiments of the disclosed subject matter;

FIG. 10B illustrates the process of pairing and programming of the Mutual Disabling Unit (MDU) and audio devices pairing process, in accordance with some exemplary embodiments of the disclosed subject matter;

FIG. 11A schematically illustrates a flow chart of the normal operation of the Mutual Disabling Unit (MDU) having, in accordance with some exemplary embodiments of the disclosed subject matter.

DETAILED DESCRIPTION

Figure 1:
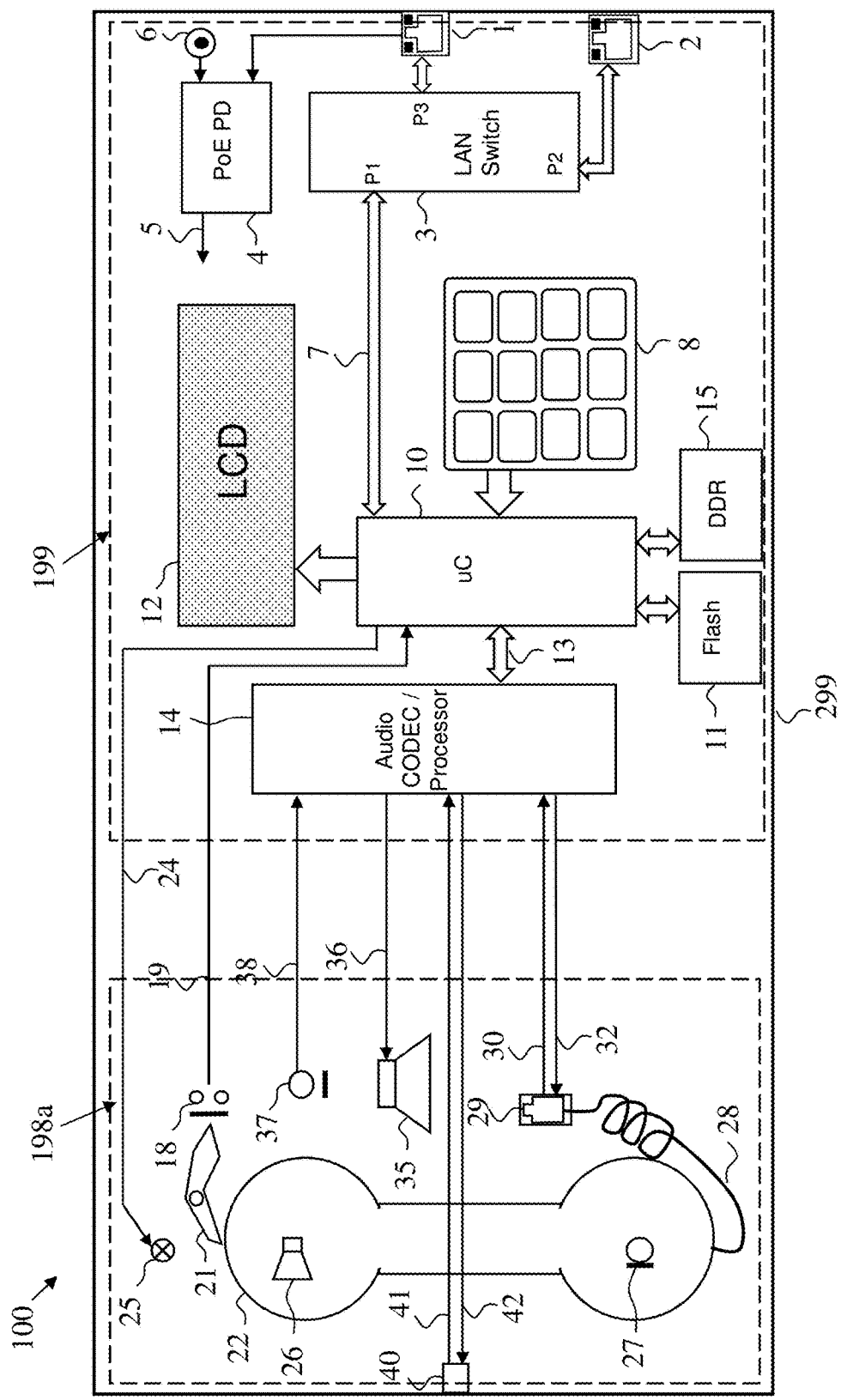
FIG. 1 illustrates a block diagram of a typical VoIP phone device as known in the prior art.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand-alone programs, may be incorporated as subroutines in an operating system, may be functions in an installed software package, and the like.

FIG. 1 schematically illustrates a block diagram of a typical VoIP phone device 100 as known in the prior art.

In this figure, VoIP phone device 100, situated in enclosure 299, is having first LAN jack 1 to enable connection of the device to the LAN (Local Area Network) switch (not shown here). First LAN jack 1 is typically RJ45 standard modular jack having internal or external LAN magnetics for impedance matching, noise filtering, power delivery and safety isolation. First LAN jack 1 is internally coupled to the Power over Ethernet (PoE) Powered Device (PD) block 4 to enable device 100 operation without local power source. PoE PD block is generating one or more DC voltage 5 that power the entire device 100 circuitry. Typical voltages would be 5V, 3.3V and 1.2V. Optional DC power jack 6 enables device 100 power from local 48 VDC or AC power supply (not shown here) in the case that network does not support POE.

An example of PoE PD 4 chip is Silicon Labs Si3402. This chip comprises of IEEE 802.3-Compliant POE PD interface together with isolated/non-isolated switching regulator.

First LAN jack 1 is further coupled to the 3-port LAN switch 3 port P3 to enable support of a both VoIP phone device 100 and PC (not shown here) through a single LAN extension. An example of 3-Port LAN switch chip is Micrel/Microchip KSZ8863RLL managed switch having two 10/100Base-TX transceivers to support LAN and PC and one RMII (Reduced media-independent interface) to support the device microcontroller function 10. In this figure PC is coupled to the device 100 through the optional second LAN jack 2 that is in turn coupled to the LAN switch 3 second port P2. First 3-port LAN switch 3 port P1 is coupled to the microcontroller function 10 through RMII lines 7.

Second LAN jack 2 is typically RJ45 standard modular jack having internal or external LAN magnetics for impedance matching, noise filtering, and safety isolation.

Microcontroller function 10 may have internal or external functions such as RAM (Random Access Memory), DSP (Digital Signal Processor), Audio CODEC (coder/decoder) etc. Microcontroller function 10 runs and manage all VoIP phone 100 digital functionality and user interface. In this example the microcontroller function 10 is coupled to an external flash device 11 and external DDR (Dual Data Rate) volatile memory 15.

The user interface is typically based on textual or graphical an LCD (Liquid Crystal Display) panel 12 that provides user indications, and push-buttons/keypad 8 that enables user inputs (for example phone number dialing).

Microcontroller function 10 is further coupled to the audio CODEC or processor function 14 through serial bus 13 (for example I2S). Audio CODEC or processor function 14 (sometimes called Audio Processor, Acoustic Echo Cancelation or Analog Front End or AFE) handles all VoIP phone device 100 analog functions. For example: audio mixer, audio power amplifier, music playback, Dual-tone multi-frequency signaling (DTMF) receiver, audio pre-amplifier, microphone bias generator, filter, Acoustic Echo Cancelation, Line Echo Cancellation, Analog to Digital conversion and Digital to Analog conversion. Audio CODEC or processor function 14 may be supported by external devices—for example Audio Class-D amplifier and microphone preamplifier.

An example of microcontroller function 10 is DSP Group DVFD8187BE chip that integrates ARM 926 core with DSP (digital signal processor), Analog Front End (AFE) 14 and speaker amplifier. It also integrating the power supply circuitry to generate 1.2V, 1.8V, 3.3V power planes.

Audio CODEC or processor function 14 drives and support directly or through external electronic circuitry the following audio transducers:
1. Phone base microphone 37 coupled through lines 38, to enable hands-free call operation audio input;
2. Phone base speaker 35 coupled through lines 36, to enable hands-free call operation audio output;
3. Handset microphone element 27, in handset 22, coupled through coiled multi-conductor cable 28, modular handset jack 29 and lines 30 to enable call audio input while holding the handset;
4. Handset 22 earphone element 26 coupled through coiled multi-conductor cable 28, modular handset jack 29 and lines 32 to enable call audio output while holding the handset;
5. Optional headset microphone (not shown here) coupled through the headset modular jack 40 and lines 41 to enable audio input while using is wearing an headset; and
6. Optional headset speaker (not shown here) coupled through the headset modular jack 40 and lines 42 to enable audio output while using is wearing a headset.

It should be noted that the phone ringing audio output function may be performed by the said phone base speaker 35 or by a dedicated sound transducer (not shown here).

When handset 22 is in its cradle (not seen in these figures) it mechanically activates through lever 21, the off-on hook switch 18 that in turn coupled to the microcontroller function 10 via line 19. The off-on hook switch 18 senses when the handset 22 is being placed on the phone device 100 or when the user removed it to place a call. The off-on hook switch 18 may be a simple electromechanical switch, magnetic proximity sensor or optical-switch depending on device specific design.

In some VoIP phone devices, the handset or the base is further equipped with LED indicator 25 for call and voice messages. This indicator LED 25 is used to indicate whether you have an incoming call (for example by flashing red color) or a new voice message (for example by steady red color). LED indicator 25 is derived by the microcontroller function 10 through line 24.

LED indicator 25 may be single color LED that illuminate steadily or blink. It may also be multi-color LED or multiple individual LEDs. For example, in some devices steady green LED indicate on-going call while red LED indicate phone ringing.

With reference to FIG. 1 the following security vulnerabilities may be further described:

1. If remote attacker can tamper or modify the software running on microcontroller function 10, handset microphone 27 may be activated without any user action to enable audio eavesdropping by sending surrounding conversation audio via microcontroller function 10 over the IP network to the remote attacker;
2. If remote attacker can tamper or modify the software running on microcontroller function 10, base microphone 37 may be activated without any user action to enable audio eavesdropping by sending surrounding conversation audio via microcontroller function 10 over the IP network to the remote attacker;
3. If remote attacker can tamper or modify the software running on microcontroller function 10, handset headphone element 26 may be activated and abused as a low-gain dynamic microphone without any user action to enable audio eavesdropping by sending surrounding conversation audio via microcontroller function 10 over the IP network to the remote attacker;
4. If remote attacker can tamper or modify the software running on microcontroller function 10, base speaker 35 may be activated and abused as a low-gain dynamic microphone without any user action to enable audio eavesdropping by sending surrounding conversation audio via microcontroller function 10 over the IP network to the remote attacker;
5. If remote attacker can tamper or modify the software running on microcontroller function 10, optional headset microphone may be activated without any user action to enable audio eavesdropping by sending surrounding conversation audio via microcontroller function 10 over the IP network to the remote attacker;
6. If remote attacker can tamper or modify the software running on microcontroller function 10, optional headset speaker may be activated and abused as a low-gain dynamic microphone without any user action to enable audio eavesdropping by sending surrounding conversation audio via microcontroller function 10 over the IP network to the remote attacker;

It should be noted that since the off-on hook switch 18 is coupled to the microcontroller function 10 input port, such input may be ignored if software is being modified.

It should be noted that the "standard, non-secure VoIP phone" as referred to herein may comprise other security. Such "standard security measures" may include: physical locks to prevent removing the phone or unauthorized use of it; encryption the voice data or scrambling the voice; incoming call ID or outgoing call ID masking, etc. The electronics hardware in a standard VoIP phone, that performs the VoIP functions is defined in FIG. 1 (zone 199) and will be termed herein as "phone's standard hardware"; or "phone's non-secure hardware".

Similarly, some of the user's inputs and outputs are defined in FIG. 1 (zone 198a) and are termed "non-secure user's inputs and outputs" when used in the art. Same elements, when secured by the security implants (zone 198 in FIGS. 2 and 3C) are termed secure inputs and outputs 198.

Figure 2:
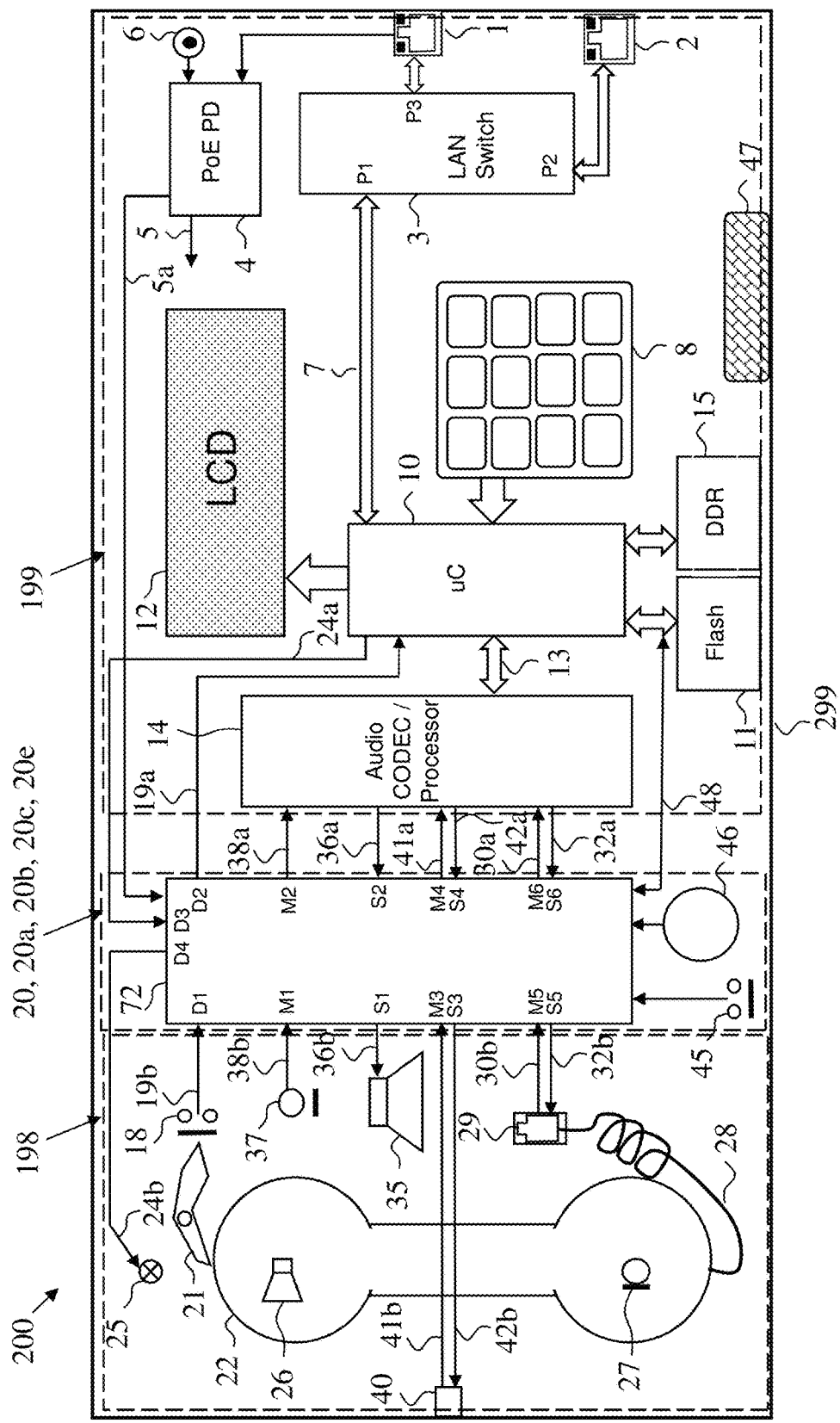
FIG. 2 schematically illustrates security enhanced VoIP phone device as known in the prior art.

FIG. 2 schematically illustrates security enhanced VoIP phone device 200 as known in the prior art.

The phone functionality of the embodiment depicted in FIG. 2 is similar to that depicted in FIG. 1 and thus, only the added elements aimed at mitigating the security vulnerabilities described above by means of security implant function 20. Security implant function 20 may be implemented through a dedicated implant that assembled inside a standard (non-secure) VoIP device 100 of FIG. 1 above or embedded inside the design of a secure phone device.

Security implant function 20 is connected between the handset 22 microphone element 27 and the audio CODEC or processor function 14 through coiled multi-conductor cable 28, handset modular jack 29, lines 30b and port M5 at the handset side. It is further coupled to the audio CODEC or processor function 14 through port M6 and lines 30a on the other side.

Security implant function 20 is connected between the handset 22 headphone element 26 and the audio CODEC or processor function or processor 14 through coiled multi-conductor cable 28, handset modular jack 29, lines 32b and port S5 at the handset side. It is further coupled to the audio CODEC or processor function 14 through port S6 and lines 32a on the other side.

Security implant function 20 is connected between the base microphone element 37 and the audio CODEC or processor function 14 through lines 38b and port M1 at the microphone side. It is further coupled to the audio CODEC or processor function 14 through port M2 and lines 38a on the other side.

Security implant function 20 is connected between the base speaker 35 and the audio CODEC or processor function 14 through lines 36b and port S1 at the speaker side. It is further coupled to the audio CODEC or processor function 14 through port S2 and lines 36a on the other side.

Security implant function 20 is further connected between the optional headset microphone element and the audio CODEC or processor function 14 through the optional headset modular jack 40, lines 41b and port M3 at the jack side. It is further coupled to the audio CODEC or processor function 14 through port M4 and lines 41a on the other side.

Security implant function 20 is further connected between the optional headset headphone element and the audio CODEC or processor function 14 through the optional headset modular jack 40, lines 42b and port S3 at the jack side. It is further coupled to the audio CODEC or processor function 14 through port S4 and lines 42a on the other side.

Security implant function 20 is further connected between the off-on hook switch 18 and the microcontroller function 10 through lines 19b and port D1 at the switch side. It is further coupled to the microcontroller function 10 through port D2 and lines 19a on the other side.

Security implant function 20 may also be connected to the microcontroller function 10 one or more flash memory bus lines through lines 48 to enable write-protection or trusted boot of the microcontroller function 10.

Security implant function 20 is further coupled to a tempering switch 45 that is strategically located inside the VoIP phone device 200 enclosure 299 to enable detection of mechanical tampering attempt. Battery 46 powers the security implant function anti-tampering when device is unpowered.

Tampering Evident Label 47 is strategically located on the VoIP phone device 200 enclosure partying-line to provide visible indications in case that attacker may attempt to gain physical access to the device internal circuitry. Such label may be special holographic type to allow positive identification of the trusted supply source.

Low-voltage DC power to the security implant function 20 is supplied via lines 5a from the PoE block 4. It should be noted that typical prior art VoIP Phone is having excess power capabilities and therefore the small amount of power needed for the security implant 20 may be typically extracted from that device PoE block 4 or from the low voltage DC/DC converters that are coupled to it. For example, security implant 20 may be coupled to the device 3.3V power plane and consume 20 to 30 mA of power in normal use.

As can be seen by noting the differences between FIG. 1 and FIG. 2, a security implant (marked as 20, 20a, 20b within the dashed line box) was added to a standard VoIP phone of FIG. 1. The security implant separates the phone's standard hardware 199 (to the right of the implant, within the dashed line box) from the secure inputs and outputs 198 (earphones/speakers, microphones, off-on hook switch, and the LED indicator, to the left of the security implant, within the dashed line box).

The operation of the phone's standard hardware is unchanged, providing the full usability and operation options of the standard VoIP phone of FIG. 1. However, the access of the phone's standard hardware 199 to the secure inputs and outputs is under the strict control of the security implant. Thus, the user can be assured that once a call is not in progress (hand set 22 is on-hook, LED indicator 25 not showing "call in progress" indication), no eavesdropping may be activated as all the microphones and earphones/speakers are disconnected by the trusted security implant.

The abovementioned separation of the VoIP phone into three zones:
Phone's standard hardware 199;
Security implant; and
Secure inputs and outputs 198, The implant according to exemplary embodiments may be used by phone manufactures to provide secure and non-secure versions of their VoIP products with minimal design or re-design efforts. For example, all the parts outside the security implant may be designed and/or purchased from a low-security outside vendor, or based on a previous non-secure product.

Similarly, security qualification tests and verifications need to be applied only to the security implant in order to qualify the entire secure VoIP phone.

Figure 3A:
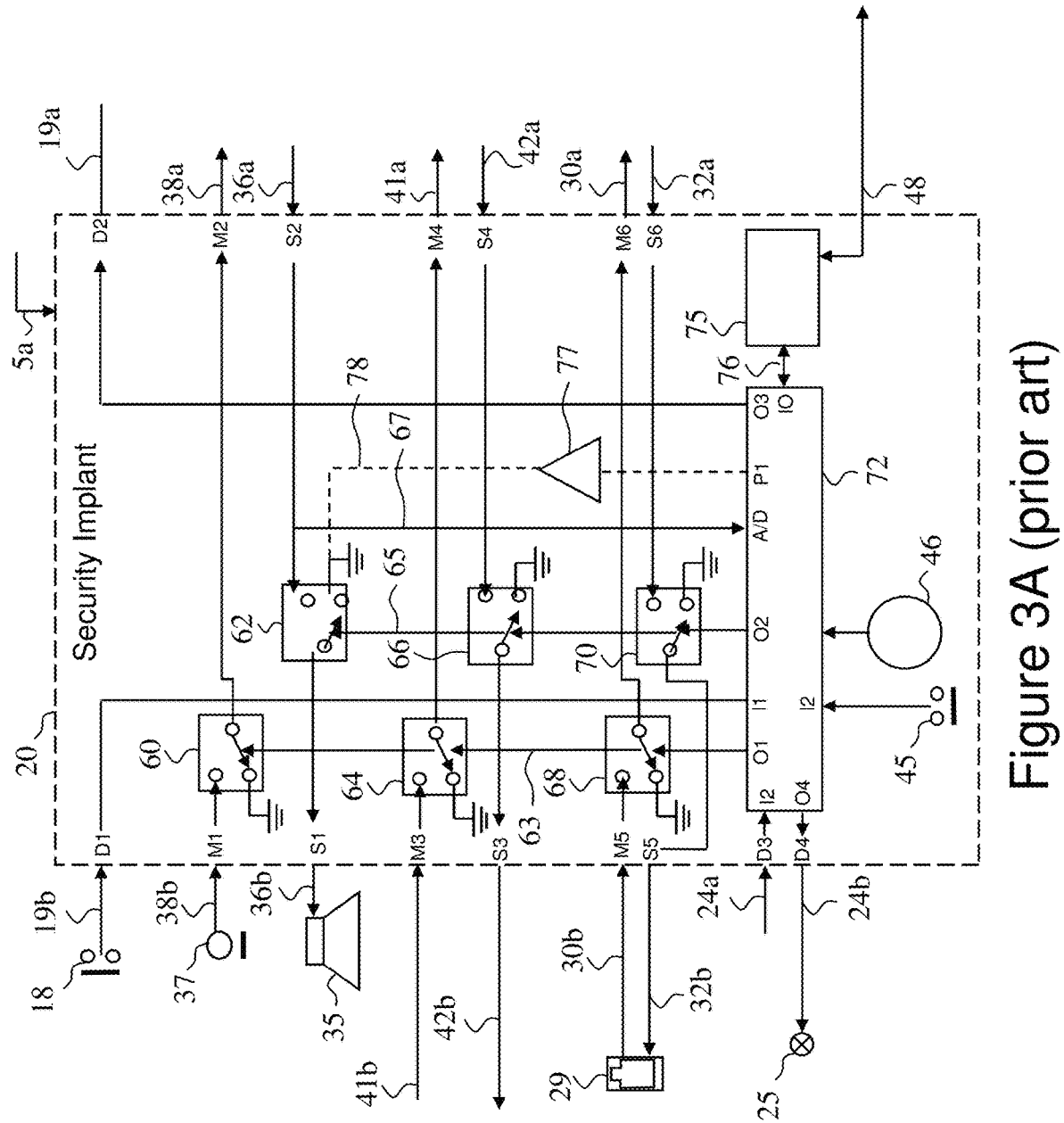
FIG. 3A schematically illustrates the security implant function shown in FIG. 2 according to an exemplary embodiment of the current invention.

FIG. 3A schematically illustrates the security implant function 20 shown in FIG. 2 above as known in the prior art. This figure specifically illustrating Cisco 7811 VoIP phone (Cisco Systems, Inc. Corporate Headquarters 170 West Tasman Dr. San Jose, Calif. 95134; USA. information available from: www.cisco.com/c/en/us/products/collaboration-endpoints/ip-phone-7811/index.html.). Still with minor changes similar implants may be designed to fit most standard VoIP phone models from various vendors.

It should be noted here that the term implant that used here may include implementations such as an extra Printed Circuit Board Assembly or module attached to standard VoIP phone or module that being implemented by the phone vendor in its finished product as an optional plug-in module or as standard function for that model. Such implant may be a single piece, or few items (such as multiple PCBAs), and may include mechanical connections to the frame, housing or internal parts of the standard VoIP phone. Cabling, battery, battery holder, and connectors may also be a part of the implant.

Implant port D1 is coupled externally to the off-on hook switch 18 through line 19b. Implant port D1 is coupled internally to the security microcontroller function 72 input port I1. It should be noted that security functions may be implemented with other electronic functions such as: Complex Programmable Logic Device (CPLD), Application Specific Integrated Circuit (ASIC), Field-Programmable Gate Array (FPGA), or discrete components. It is also possible to connect the input port I1 directly to ports O1, O2 and O3 and therefore completely eliminate this function. Security microcontroller 72 receives the state of the off-on hook switch 18 and generate appropriate off-on hook command to the VoIP phone microcontroller function 10 through output port O3, implant port D2 and line 19a. This allows the security microcontroller function 72 to monitor the state of the phone handset and to manipulate that signal to the phone microcontroller function.

In the security module 20 shown in this figure, there are essentially two separate audio switching command outputs of security microcontroller function 72:
1. O1 through lines 63 mutes all 3 audio input sources (handset microphone element 27, headset microphone (via line 41b) and base microphone element 37).
2. O2 through lines 65 mutes all 3 audio outputs (handset speaker 26, headset speaker (via line 42b) and base speaker 35).

Security microcontroller function 72 can mute all audio inputs when there is no active call detected. It can further mute all audio outputs when there is no active call or ringing detected.

The term mute used here means that:
1. Audio input transducer is isolated (disconnected) from its audio CODEC or process input circuitry;
2. Audio output transducer (speaker) is isolated (disconnected) from its audio CODEC or process output circuitry;

Implant port M1 is coupled externally to the base microphone 37 through line 38b. Implant port M1 is coupled internally to first analog audio switch 60. First analog audio switch 60 is preferably a solid-state SPDT (Single Pole Dual Throw) switch but may be any other switch type (for example reed relay or small signal relay). First analog switch 60 is driven by the security microcontroller function 72 output port O1. First analog audio switch 60 is normally shorting the preamplifier input in the audio CODEC or processor 14 to the ground (switch is in the lower position as shown in the figure). Only when signal 63 is asserted by the security microcontroller function 72 output port O1, Audio CODEC or processor 14 microphone input port is routed through line 38a, security implant port M2, first analog switch 60, implant port M1 and line 38b to the base microphone 37 to enable secure use of that microphone.

Similarly, implant port S1 is coupled externally to the base speaker 35 through line 36b. Implant port S1 is coupled internally to second analog audio switch 62. Second analog switch 62 may be SPDT or Dual Pole Dual Throw (DPDT) (if differential speaker signal must be supported). An example of such analog audio switch is Texas Instruments (TI) TS5A22364-Q1. This chip comprises of low-distortion 0.65-Ω Dual SPDT Analog Switch with Negative Signaling Capability.

Second analog switch 62 is driven by the security microcontroller function 72 output port O2. Second analog audio switch 62 is normally shorting the base speaker to the ground (switch is in the lower position as shown in the figure), only when signal 65 is asserted by the security microcontroller function 72 output port O2, Audio CODEC or processor 14 speaker output is routed through line 36a, security implant port S2, second analog switch 62, implant port S1 and line 36b to the base speaker 35 to enable secure use of that speaker. It should be noted that this analog audio switch 62 may be alternatively replaced by audio diode as shown in next FIG. 3C.

Similarly, implant port M5 is coupled externally to the handset microphone element 27 (shown in FIG. 2 above) through line 30b, handset modular jack 29 and coiled multi-conductor cable 28. Implant port M5 is coupled internally to third analog audio switch 68. Third analog switch 68 is driven by the security microcontroller function 72 output port O1 (same output port that drives the first analog audio switch) or by a separate output port if needed. Third analog audio switch 68 is normally shorting the preamplifier input in the audio CODEC or processor 14 to the ground (switch is in the lower position as shown in the figure). Only when signal 63 is asserted by the security microcontroller function 72 output port O1, Audio CODEC or processor 14 microphone input port is routed through line 30a, security implant port M6, third analog switch 68, implant port M5, line 30b, handset modular jack 29 and coiled multi-conductor cable 28 to the handset microphone element 27 to enable secure use of that microphone.

Similarly, implant port S5 is coupled externally to the handset headphone element 27 (shown in FIG. 2 above) through lines 32b, handset modular jack 29 and coiled multi-conductor cable 28. Implant port S5 is coupled internally to fourth analog audio switch 70. Fourth analog switch 70 may be driven by the security microcontroller function 72 output port O2 as show in FIGS. 3A-B or by a separate output port if needed. Analog audio switch 62 is normally shorting the base speaker 35 to the ground (switch is in the lower position as shown in the figure), only when signal 65 is asserted by the security microcontroller function 72 output port O2, Audio CODEC or processor 14 audio output is routed through line 32a, security implant port S6, fourth analog switch 70, implant port S1 and line 32b, handset modular jack 29 and coiled multi-conductor cable 28 to the handset headphone element 26 to enable secure use of that handset.

Figure 3B:
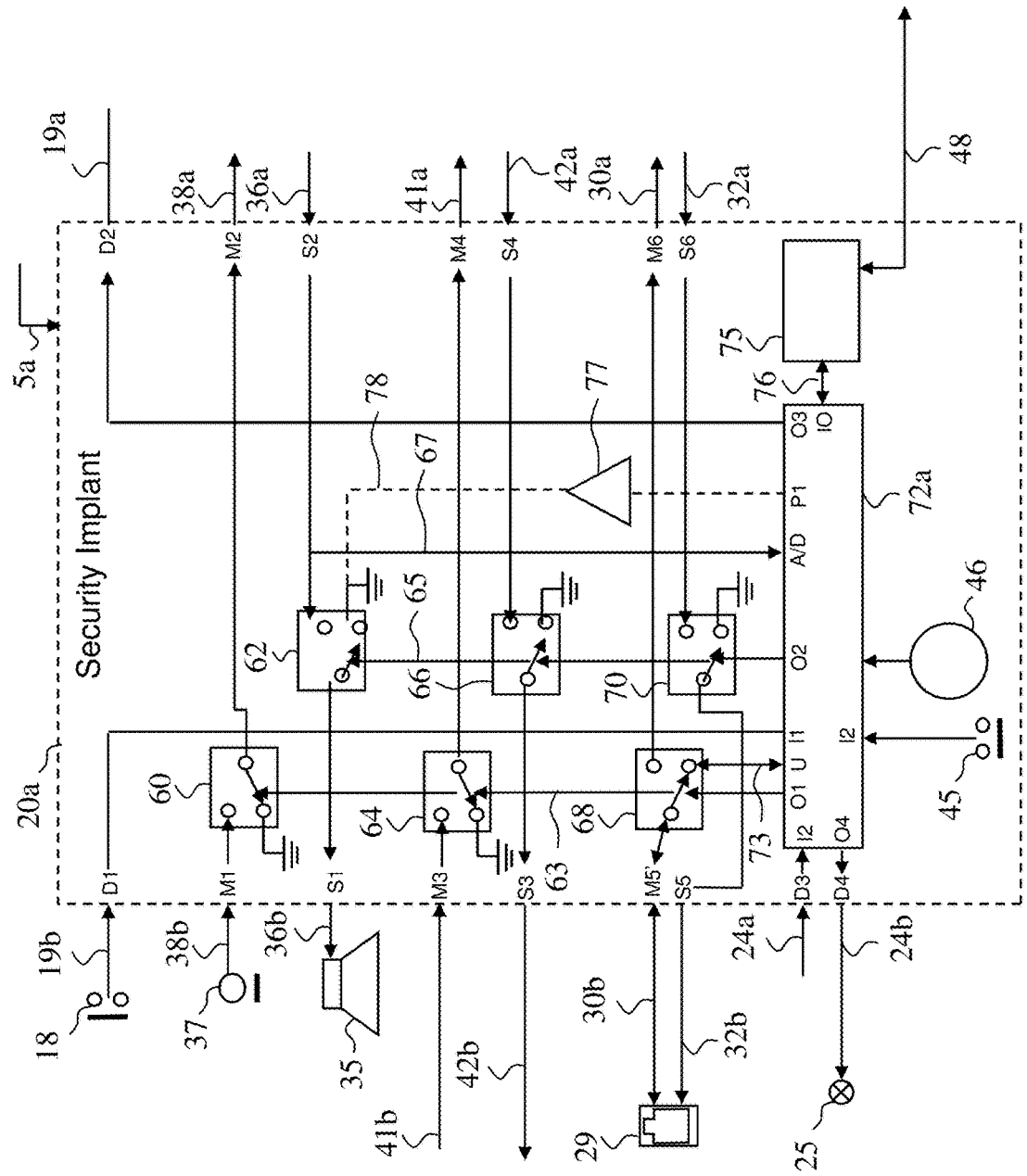
FIG. 3B schematically illustrates a security implant function according to another exemplary embodiment known in the art.
Figure 3C:
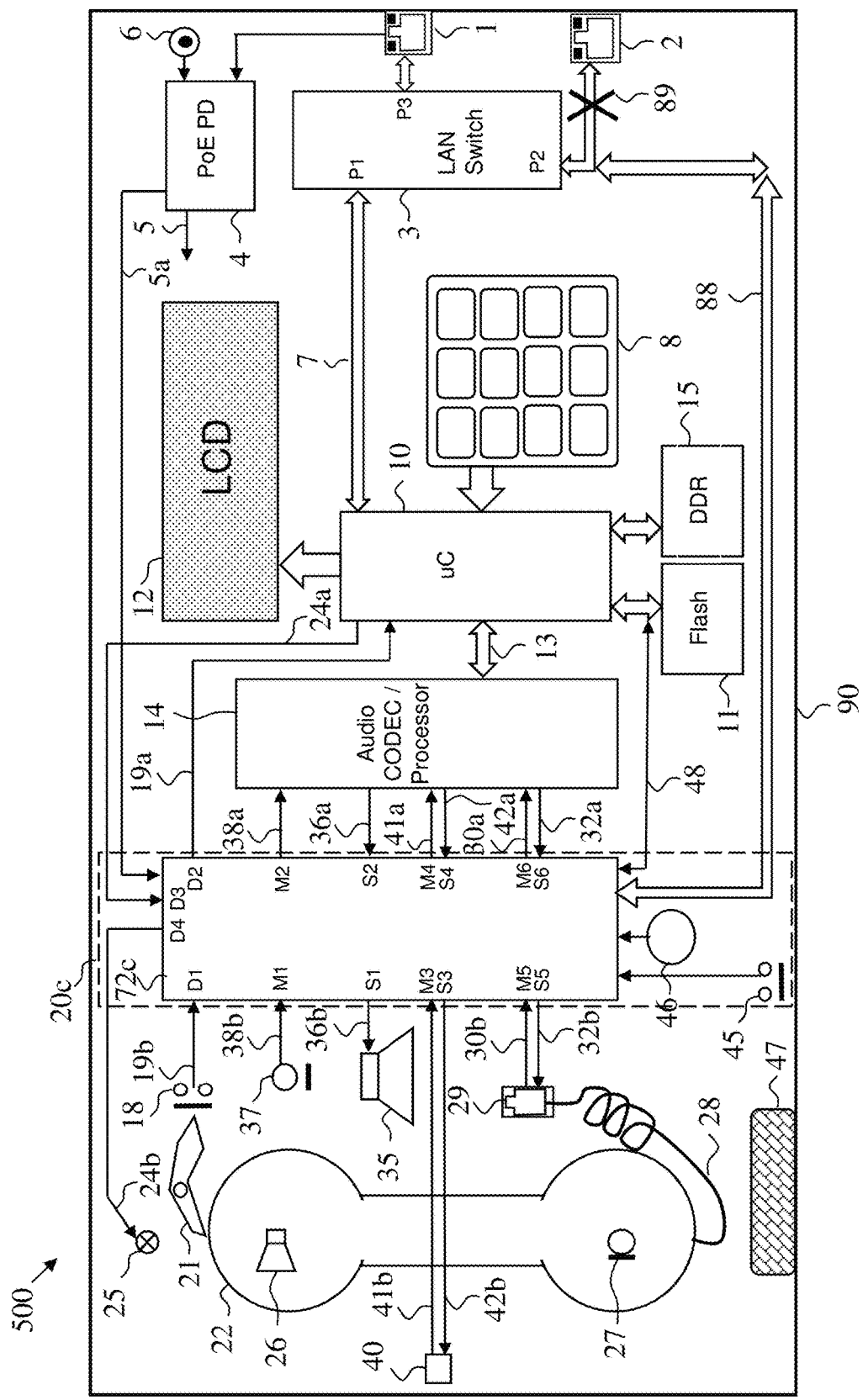
FIG. 3C schematically illustrates a security enhanced VoIP phone device according to another exemplary embodiment known in the art.

It should be noted that this analog audio switch 70 may be alternatively replaced by audio diode as shown in next FIG. 3C.

Similarly, implant port M3 is coupled externally to the optional headset microphone element through line 41b, and headset modular jack 40 shown in FIGS. 1 and 2 above). Implant port M3 is coupled internally to fifth analog audio switch 64. Fifth analog switch 64 is driven by the security microcontroller function 72 output port O1 (same output port that drives the first analog audio switch) through line 63 or by a separate output port if needed. Fifth analog audio switch 64 is normally shorting the preamplifier input in the audio CODEC or processor 14 to the ground (switch is in the lower position as shown in the figure). Only when signal 63 is asserted by the security microcontroller function 72 output port O1, Audio CODEC or processor 14 microphone input port is routed through line 41a, security implant 20 port M4, fifth analog switch 64, implant port M3, line 41b, headset modular jack 40 to the headset microphone element (not shown here) to enable secure use of that headset microphone.

Similarly, implant port S3 is coupled externally to the optional headset headphone element through lines 42b, and headset modular jack 40 shown in FIGS. 1 and 2 above. Security implant 20 port S3 is coupled internally to sixth analog audio switch 66. Sixth analog switch 66 may be driven by the security microcontroller function 72 output port O2 as show in FIG. 3 or by a separate output port if needed. Sixth analog audio switch 66 is normally shorting the headset headphone element to the ground (switch is in the lower position as shown in the figure), only when signal 65 is asserted by the security microcontroller function 72 output port O2, Audio CODEC or processor 14 audio output is routed through line 42a, security implant 20 port S4, sixth analog switch 66, security implant port S3 and line 42b, headset modular jack 40 to the headset headphone element to enable secure use of that headset.

It should be noted that this analog audio switch 66 may be alternatively replaced by audio diode as shown in next FIG. 3C.

The handset or the base is further equipped with LED indicator 25 for call, voice messages and for security indications. This indicator LED 25 is used to provide the following user indications:

It is used to indicate whether there is an incoming call (for example by flashing red color);

It is used to indicate if there is a new voice message (for example by steady red color);

It is used to indicate if the device is in secure state (for example by slow blinking of green color).

LED indicator 25 is derived by the security microcontroller function 72 output port O4 through security implant port D4 and line 24b. It should be noted that LED 25 indicator may be single color LED or may be replaced by a bi-color LED to support more user indications. Security microcontroller function 72 is further coupled to the VoIP phone device 100 microcontroller function 10 through input port 12, security implant port D3 and line 24a.

Security microcontroller function 72 may pass indication commands from microcontroller function 10 or may generate local or modified user indications as needed.

Security implant 20 may be further equipped with active-anti-tampering subsystem to enable self-destruction in case that the VoIP phone device 200 is being tampered. Tampering switch 45 is located in such location that any attempt to gain access to the security implant 20 or to the VoIP phone circuitry will release the switch 45. Upon releasing tampering switch 45, the security implant 20 security microcontroller 72 coupled to the switch through input port I2, is causing irreversible change or damage. Such change or damage may cause the following device behavior:

1. All audio switches are disabled (preventing any audio input or output devices from connected to the audio CODEC or processor 14; and
2. Audio tone is injected into the base speaker to alert the user; and
3. Indicator LED 25 is operating in tampering mode (for example alternate flashing of green and red).

Security implant 20 is powered from the VoIP phone device 200 POE block 4 of FIG. 2 above via line 5a. Additional DC/DC converters may be added in the security implant to convert the available voltage to required voltage if necessary.

Security implant 20 may be further equipped with audio alert function that uses the security microcontroller 72 Pulse Width Modulation (PWM) or General Purpose Input Output (GPIO) port P1 to generate audio sound wave. Other means for signal generation, or a dedicated buzzer may be used, this wave is routed through an optional audio amplifier 77 and line 78 to the second audio switch lower port. It should be noted that in the case that this option is used, the ground should be disconnected. Amplified audio signal is then routed through security implant 20 port S1, and line 36b to base speaker 35.

To enable anti-tampering sub-system to operate when the VoIP phone device 200 is in storage or in the supply chain (device unpowered), the security implant 20 may be further equipped with battery cell or super-capacitor 46.

Security implant 20 security microcontroller 72 may sample incoming audio signal from implant port S2 through line 67 and security microcontroller 72 Analog to Digital port A/D to enable detection of activity such as ringing. Such detection may assist with or without LED indicator 25 output in determining when the base speaker 35 should be active and when it should be isolated for security.

Security implant 20 may further be coupled through lines 48 and flash protection electronic circuitry 75 to the VoIP phone device 200 flash interface to enable certain flash security functions. Such flash protection functions may include:

1. Protection of the flash device from firmware upgrades;
2. Protection of the flash device from certain write/erase operation;
3. Emulation of the flash device and boot from flash located in the flash protection electronic circuitry 75;
4. Detection of unauthorized flash operations and reporting to the security microcontroller function through lines 76 and port IO;
5. Permission to perform certain flash operations from security microcontroller 72 through IO port, lines 76 and the flash protection electronic circuitry 75.

FIG. 3B schematically illustrates another exemplary security implant function 20a similar to the security implant 20 of FIG. 3A above.

In this configurable security implant 20a, external USB or serial communication with the security microcontroller 72 port U is possible through one of the external interfaces—the handset modular jack 29 in this example. Such USB or serial communication may be accomplished through the connection of special RJ11 modular plug to USB Type-A plug cable, that can be plugged into the VoIP phone device 200 handset modular jack 29 using special RJ11 to USB Type-A cable. It should be noted that analog audio switch 68 and all other audio switch functions, may be Single Pole Dual Throw (SPDT) that switches a single line or preferably Dual Pole Dual Throw (DPDT) that switches two lines. Therefore, such audio switch 68 may support USB DM (Data Minus) and DP (Data Plus) lines.

An example of analog audio switch 68 capable of switching both audio and USB is Texas Instruments (TI) TS5USBA224 chip. This chip integrates DPDT multiplexers that enables USB 2.0 High-Speed (480 Mbps) and Audio with Negative Signal switching.

Once connected to a PC or laptop running special software application, the security implant 20 is enumerated as USB device (for example: CDC or Custom USB device). Then once the system administrator was properly identified and authenticated, the software application may be used to perform configuration or to upgrade the security implant firmware.

Security microcontroller 72 may further have an internal non-volatile memory such as flash to support Log function to store important security events. Such event may be for example: changes in policy, tampering triggering events etc. Log events may be stored on security microcontroller internal non-volatile memory or external flash memory device coupled to the security microcontroller 72.

Security implant 20 (or 20a) may block flash 11 write transactions unless authorized by connected PC configuration. This function may hold flash device 11 in write-protect state through lines 48.

FIG. 3C schematically illustrates yet another security enhanced VoIP phone device having an exemplary security implant function 20c similar to the security implant 20 of FIG. 3A above having LAN management interface instead of PC interface.

Security implant 20c is further coupled to the device LAN switch 3 to support management through the LAN.

The security implant 20c security microcontroller 72c is coupled through interface 88. Interface 88 may be standard protocol such as: LAN, RGMII, MII, or MDI. Interface 88 is connected to the LAN switch 3 port P2 by cutting the traces in 89 that connected to the PC jack 2. It should be noted here that in secure use PC LAN jack 2 would not be used anyway as VoIP and PCs are usually not mixed together.

Nevertheless, such solution utilizing network connection for security management may weaken the device security as it may expose it to hacking from the LAN as opposed to USB interface that requires physical access to the target device.

Figure 3D:
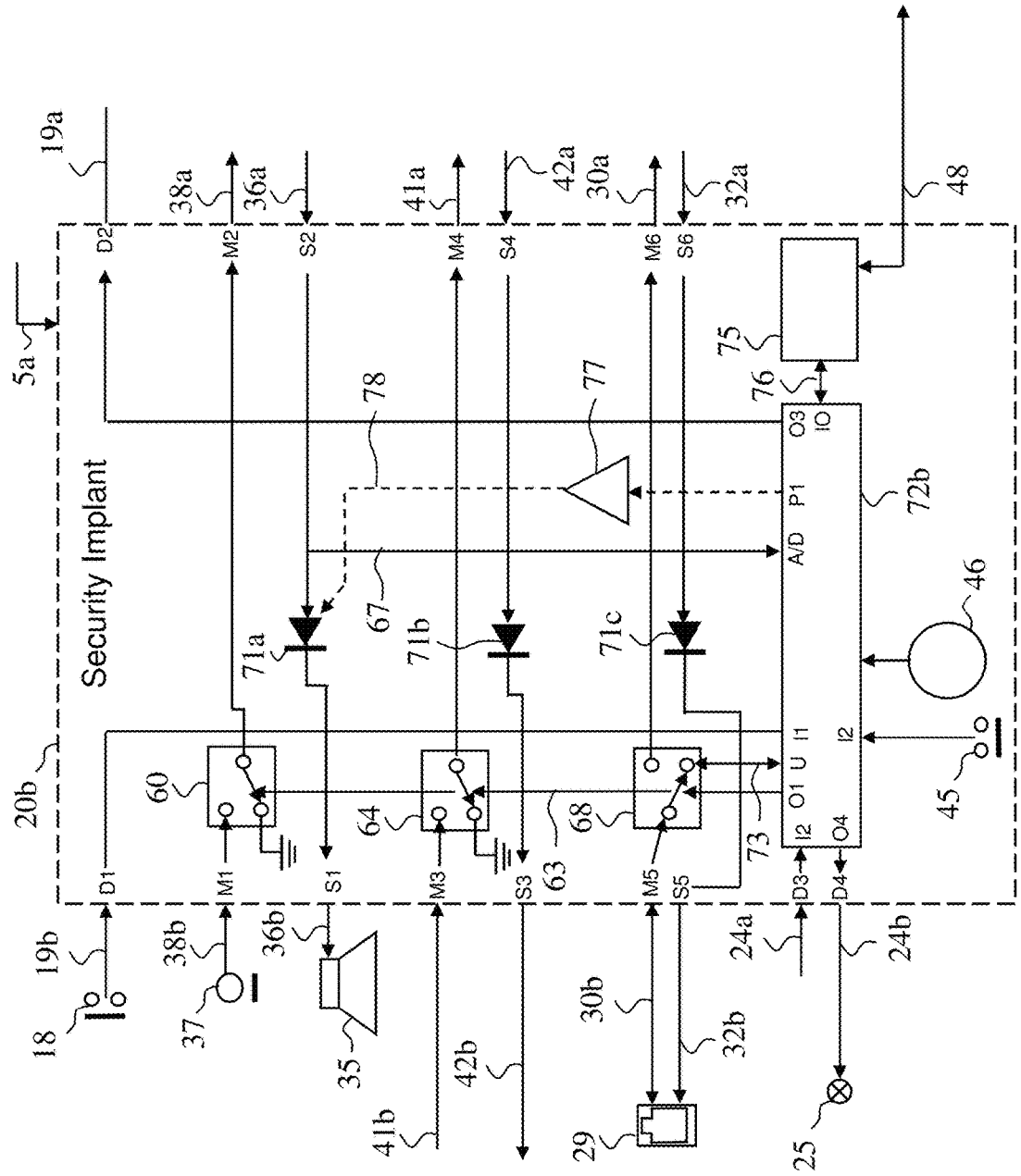
FIG. 3D schematically illustrates another exemplary security implant function similar to the security implants of FIGS. 3A and 3B known in the art.

FIG. 3D schematically illustrates another exemplary security implant function 20b similar to the security implants 20 and 20a of FIGS. 3A, 3B and 3C.

In this configurable security implant 20b, the 3 analog audio switches 62, 66 and 70 were replaced by audio diodes 71a, 71b and 71c, respectively. Audio diodes 71x are electronic circuitry (typically amplifier) that pass audio signals in one direction but blocks it in the opposite direction. The use of such audio diodes 71x prevents the potential abuse of the base speaker, handset headphone element and headset headphones element as low-gain dynamic microphone. This implementation allows these audio output transducers to be continuously coupled to the device output circuitry without any switching.

It should be noted that security implants such as 20x (security implant 20 or its variations 20a-d, termed herein as 20x) may be used in non-VoIP phones. Such phones may be completely analog (POTS—Plain Old Telephone Service), but may also have digital processors to control functions such as caller ID, contacts lists, redial, and other functions. Other non-VoIP phones may be Time-division multiplexing (TDM) phones or other standard or proprietary networks.

Such digital processor may then take the role Microcontroller function 10 and be connected through wires 48 to security implant 20x, For simple phones, lines 48 and flash protection electronic circuitry 75 may be missing, or lines 48 may be left not connected.

Figure 3E:
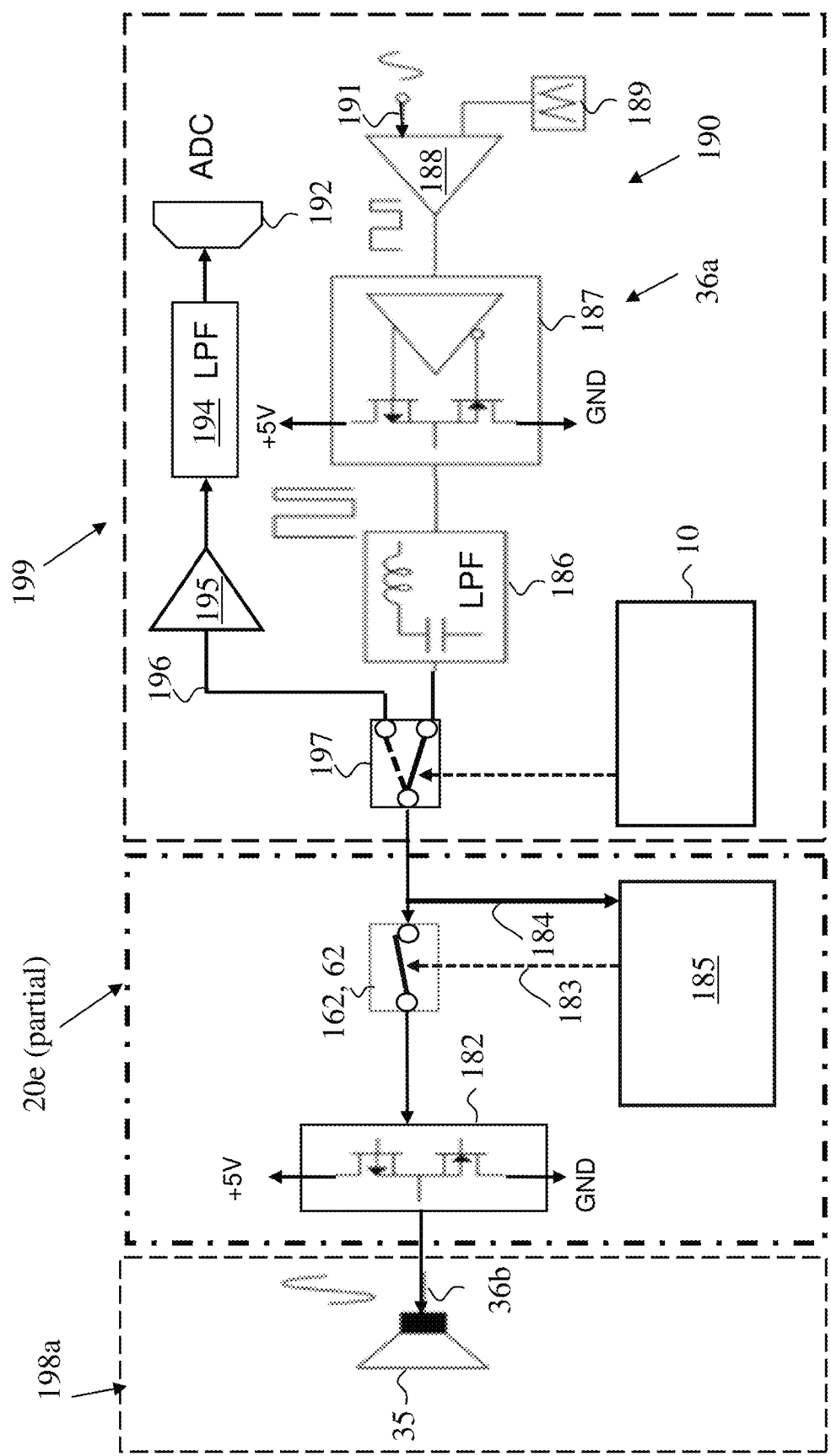
FIG. 3E schematically illustrates some details of another exemplary security implant function similar to other security implants known in the art.

FIG. 3E schematically illustrates some details of another optional exemplary security implant function 20e similar to the security implants 20x.

In this configurable security implant 20e only additional isolation of audio channel of base speaker 35 is shown to reduce culturing of the figure.

The phone's standard hardware 199 to the right of the implant is not secure and cannot be trusted. Specifically, it may include a documented or undocumented audio switching network (for example within audio CODEC processor 14) under the control of microcontroller function 10 which may be corrupted. This audio switching network may include an analog switch or multiplexer or mixer 197 that allows undesired (dashed line) routing the line 36b from base speaker 35 to a microphone channel 196 which comprises a pre-amplifier 195, Low Pass Filter 194 and Analog to Digital Converter 192, instead of the normal (desired) routing of base speaker 35 to the base speaker output channel 36a. Such undesired routing may allow using the base speaker 35 as a microphone for covert eavesdropping in case that phone processor is modified and controlled by remote attacker. If the microphone channel 196 is very sensitive, some room sounds may be detected while the base speaker 35 is coupled to ADC 192, even if audio diodes 71a(FIG. 3D) is in place (due to finite capacitance of said diode). Second analog switch 62 (FIG. 3B) prevents eavesdropping while there is no active call, or when base speaker 35 is disabled. However, Generally, base speaker output channel 36a. In normal operation, audio output 191 is amplified by a Class-D amplifier 190 which comprises: a saw tooth signal generator 189, comparator 188, switching power amplifier 187 and optional Low Pass Filter 186.

Controller 185 in implant 20e senses via sense line 184 the residual high frequency signal (typically 214 kilohertz) of tooth signal generator 189, and if no such high frequency signal is presence, activates line 183 to disconnect isolator switch 162 (which may be the same as second analog audio switch 62 of FIG. 3B).

Optionally, additionally or alternatively, audio diodes 71a may be replaced by an isolation audio power amplifier 182. Isolation audio power amplifier 182 is selected to have low return ratio (leakage current) to suppress transmission of signals from base speaker 35 to microphone channel 196.

The original LED indicator 25 is replaced with a multi-color LED, or an additional LED indicator is added to allow status indications for states not supported by the original LED indicator 25.

Figure 4A:
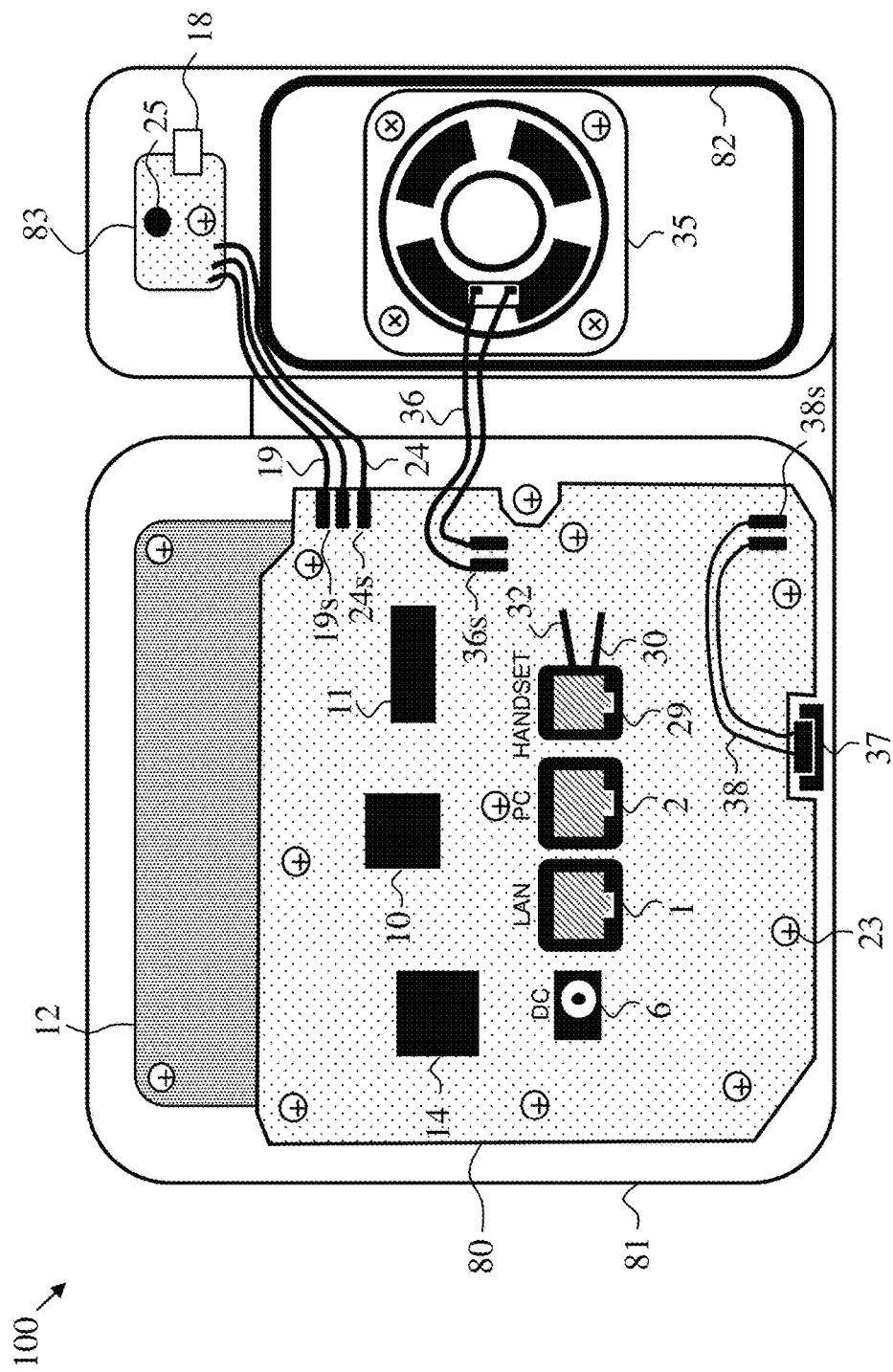
FIG. 4A schematically illustrates a rear-view of a typical VoIP phone device known in the art.

FIG. 4A schematically illustrates a rear-view of a typical VoIP phone device 100 (similar to the device shown in FIG. 1 above) with cover removed to expose the internal physical layout.

In this device (Cisco 7811 VoIP phone), the rear plastic cover was removed to better illustrate and identify the device internal parts.

Plastic enclosure 81 is the front part of the enclosure typically embedding the display 12 and the keypad 8 (not shown here). Main electronic board 80 is a PCBA (Printed Circuit Board Assembly) having different electronic components such as the microcontroller function 10 and the flash device 11 soldered to it. Also soldered to the main electronic board 80 are the DC jack 1, LAN jack 1, PC LAN jack 2 and handset modular jack 29. Handset modular jack 29 is coupled to the audio CODEC/processor 14 through lines (PCB traces) 30 for the microphone and lines (PCB traces) 32 for the headphone element.

Main electronic board 80 is mechanically coupled to the plastic enclosure 81 through multiple plastic screws 23.

Base microphone 37 is typically installed inside a rubber housing to provide noise and vibration isolation. Base microphone 37 may be soldered to the main electronic board 80 directly or wired to it through wires 38 and soldered to soldering pads 38s as shown in this FIG. 4.

Base speaker 35 is typically coupled to the plastic enclosure 81 under the handset base inside an acoustically insulated rubber bay 82. This bay may be sealed by rubber seal to prevent acoustic feedback to the base microphone 37. Base speaker 35 is wired to the main electronic board 80 through wires 36 and soldering pads 36s.

LED indicator 25 and off-on hook switch 18 are both soldered to a smaller handset PCBA 83 that is coupled to the main electronic board 80 through wires 19 and 24 and soldering pads 19s and 24s, respectively. Wires used in specific VoIP phone device 100 may be of different types, for example: single conductor, multiple conductors, and ribbon cable, flat cable etc.

Figure 4B:
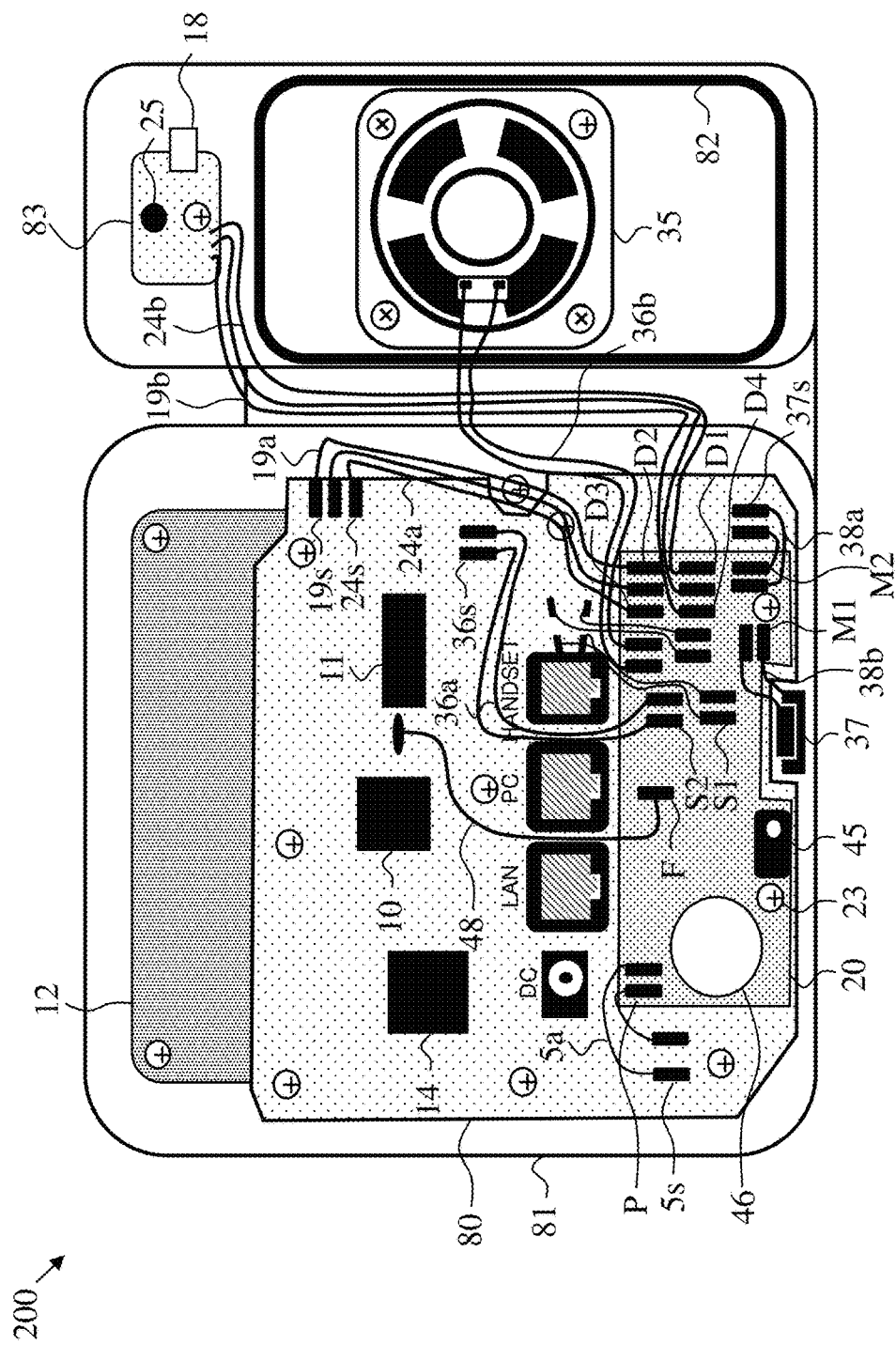
FIG. 4B schematically illustrates a rear-view of a VoIP phone device known in the art.

FIG. 4B schematically illustrates a rear-view of a VoIP phone device 200 (similar to the device shown in FIGS. 2 and 3A-B above) with cover removed to expose the internal physical layout.

In this VoIP phone device 200 security implant 20 was wired to the different components during after-market upgrade process.

Security implant 20 is mechanically coupled to the plastic enclosure 81 through two of the original plastic screws 23 that were removed and reassembled in two matching holes in the security implant 20. Coin battery 46 is soldered to the security implant 20 or inserted inside a soldered battery socket. Anti-tampering switch 45 is soldered to the security implant 20 in a location that assures that the switch lever is pushed by the rear cover. Switch location releases the switch lever if rear cover is removed or gaped.

Security implant 20 is powered from the main electronic board 80 PoE block 4 (not shown here) through soldering pads 5s, wires 5a and implant soldering pads P.

Base microphone 37 wires 38b are soldered to the security implant 20 soldering pads M1. Security implant 20 soldering pads M2 are wired through short wires 38a to the main electronic board 80 soldering pads 37s to route the switched base microphone 37 audio signals.

Similarly, base speaker 35 wires 36b are soldered to the security implant 20 soldering pads S1. Security implant 20 soldering pads S2 are wired through short wires 36a to the main electronic board 80 soldering pads 36s to route the switched base speaker 35 audio signals.

LED indicator 25 and off-on hook switch 18 are wired to the security implant 20 soldering pads D1 and D4 through wires 24b and 19b, respectively. Security implant 20 soldering pads D2 and D3 are wired to the main electronic board 80 soldering pads 24s and 19s to interface with the off-hook switch and indicator LED drive circuitry.

Microcontroller function 10 to flash device 11 interface is wired through wires 48 to security implant 20 soldering pads F to protect the flash device from unauthorized operations.

Figure 4C:
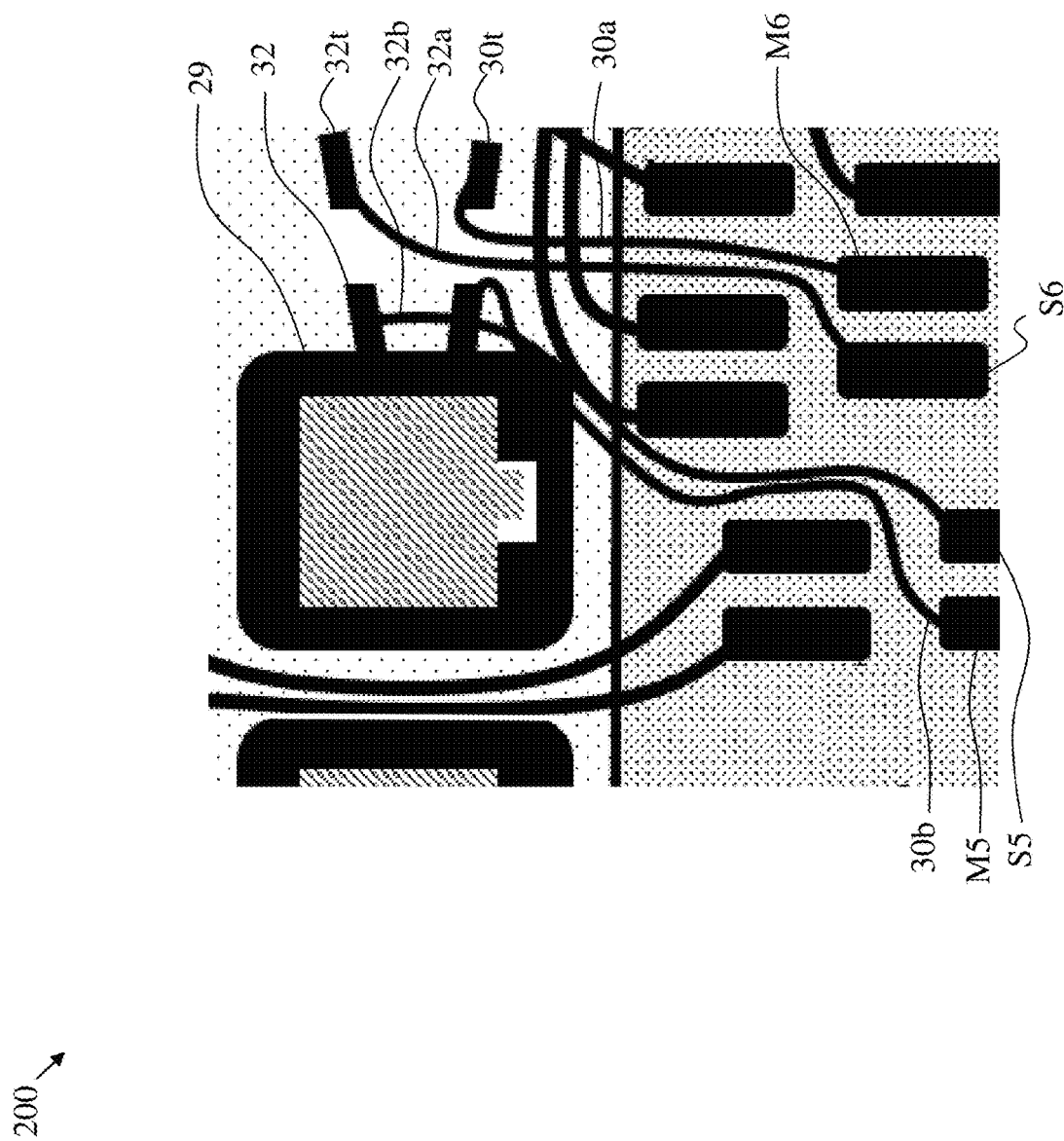
FIG. 4C schematically illustrates in greater detail the security implant wiring to the handset modular jack, known in the art.

Handset modular jack 29 traces 30 and 32 were cut and wired to the security implant 20 through additional wires as shown in FIG. 4C below.

FIG. 4C schematically illustrates in greater details the security implant 20 wiring to the handset modular jack 29.

PCB trace 32 that drives the handset headphone element 26 was cut to connect the security implant 20 in the middle to enable switching. Alternatively, series electronic component located on that trace 32 such as capacitor or resistor may be removed to avoid cutting the trace. The part of the trace that is connected to the handset modular jack 29 is wired by wire 32b to the security implant 20 soldering pad S5. The main electronic board 80 circuitry that drives the handset headphone element 26 is connected through wire 32a that is soldered to the security implant 20 soldering pad S6.

Similarly, PCB trace 30 that coupled to the handset microphone element 27 was cut to connect the security implant 20 in the middle to enable switching. Alternatively, series electronic component located on that trace 30 such as capacitor or resistor may be removed to avoid cutting the trace. The part of the trace that is connected to the handset modular jack 29 is wired by wire 30b to the security implant 20 soldering pad M5. The main electronic board 80 circuitry that amplifies the handset microphone element 27 is connected through wire 30a that is soldered to the security implant 20 soldering pad M6.

The interface between the headset modular jack and the security implant 20 is similar to the handset interface described above.

Figure 5A:
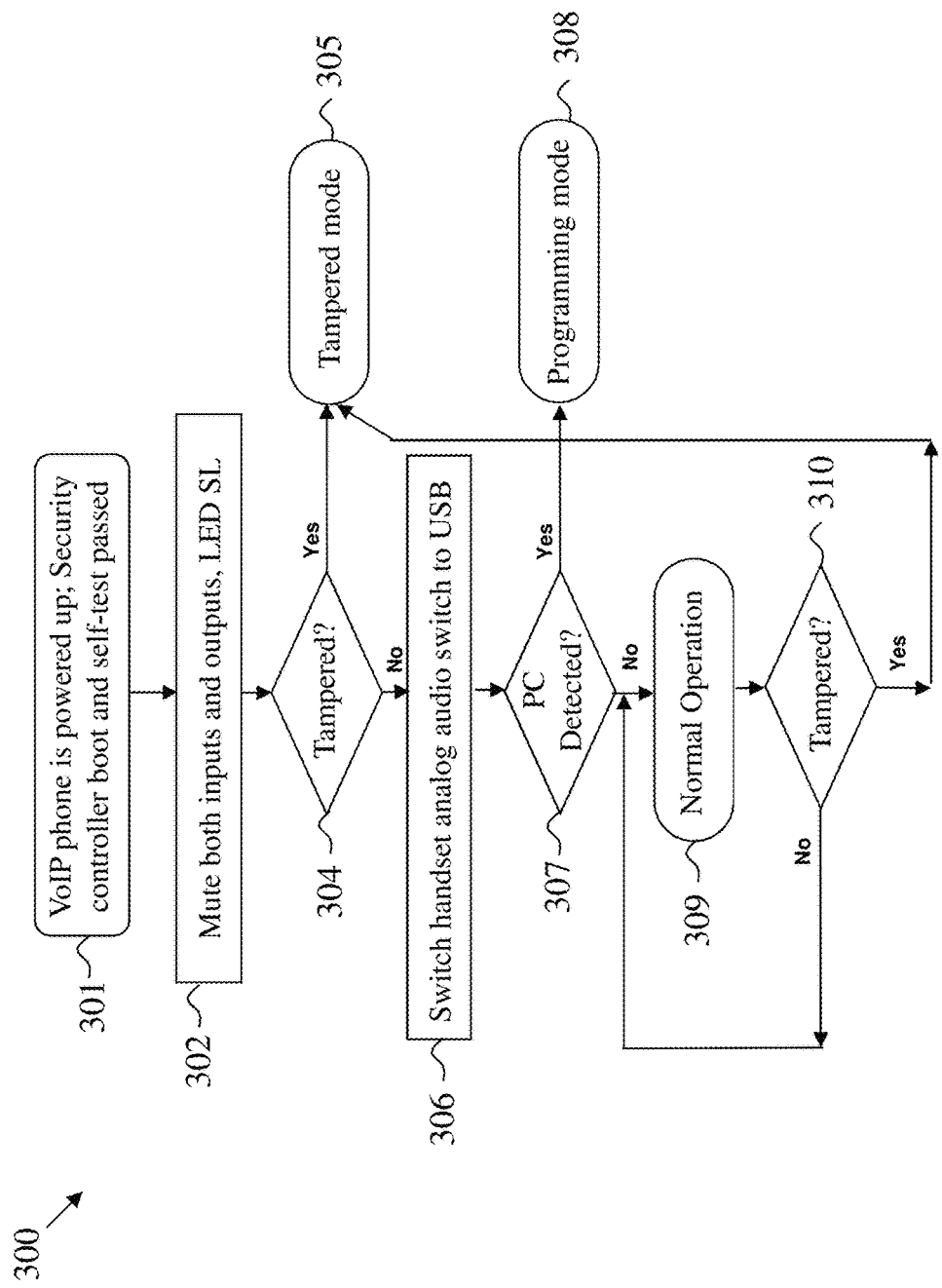
FIG. 5A schematically illustrates a high-level block diagram of method for powering up a device known in the art.

FIG. 5A schematically illustrates a high-level block diagram 300 of method for powering up a device 100.

In step 301 the VoIP phone device is powered up through connection of LAN having PoE or through external DC power source. During phone boot-up and power up, the security implant security microcontroller 72x (herein "72x" may stand for "72", "72a", "72b", or "72c") is booting and powering up as well and perform self-test. Self-test covers the critical operational and security function of the implant to assure proper operation. If self-test failed—the security implant mute (disable) audio outputs (through line 65) and inputs (through line 63) and provide proper user warning indications through LED 25.

If self-test passed, then in step 302 the security implant security microcontroller 72x is muting both audio inputs and audio outputs through lines 63 and 65, respectively. In same step 302, security microcontroller 72x also drives the green LED 25 to indicate secure state by slowly blinking in green color (Security LED—SL).

In next step 304, security microcontroller 72x checks if it was tampered (anti-tampering switch 45 opened while operating on battery 46). If tampered (Yes) then security microcontroller 72x enter tampered state 305. In that state, the phone is permanently and irreversibly disabled and secured (all audio is muted), and LED 25 provides proper tampering indications—for example solid red LED illumination. In addition audio tone may be played as aural warning.

Optional steps 306, 307, and 308 are relevant for security microcontroller 72x, for example 72a, and 72b seen in FIGS. 3B and 3D, respectively. They may be omitted if security microcontroller 72 is used in the configuration seen in FIG. 3A. If device was not tampered (No in step 304), then in next step 306 the security microcontroller 72x switch the handset analog switch 68 to the USB option and attempt to detect connected PC (PC in this example is connected prior to the phone and security implant power up. If connected PC detected, security microcontroller will enumerate and prompt for administrative user credentials to start programming mode in step 305. While in programming mode, the security microcontroller function 72x will enable management functions such as: get firmware updates, get configuration updates and enable log download. Optionally, all microphones are mute, and the phone cannot receive of initiate calls while in programming mode.

If PC was not detected in step 307 (or no such option available, as seen in FIG. 3A), in next step 309 security microcontroller 72x will enter Normal Operation mode and wait for detected events.

If tampering was detected at any time after that (while device is still powered), it will immediately change to tampered mode in step 305 above.

The device operation while in Normal Operating mode 309 if further described in FIG. 5B below.

Figure 5B:
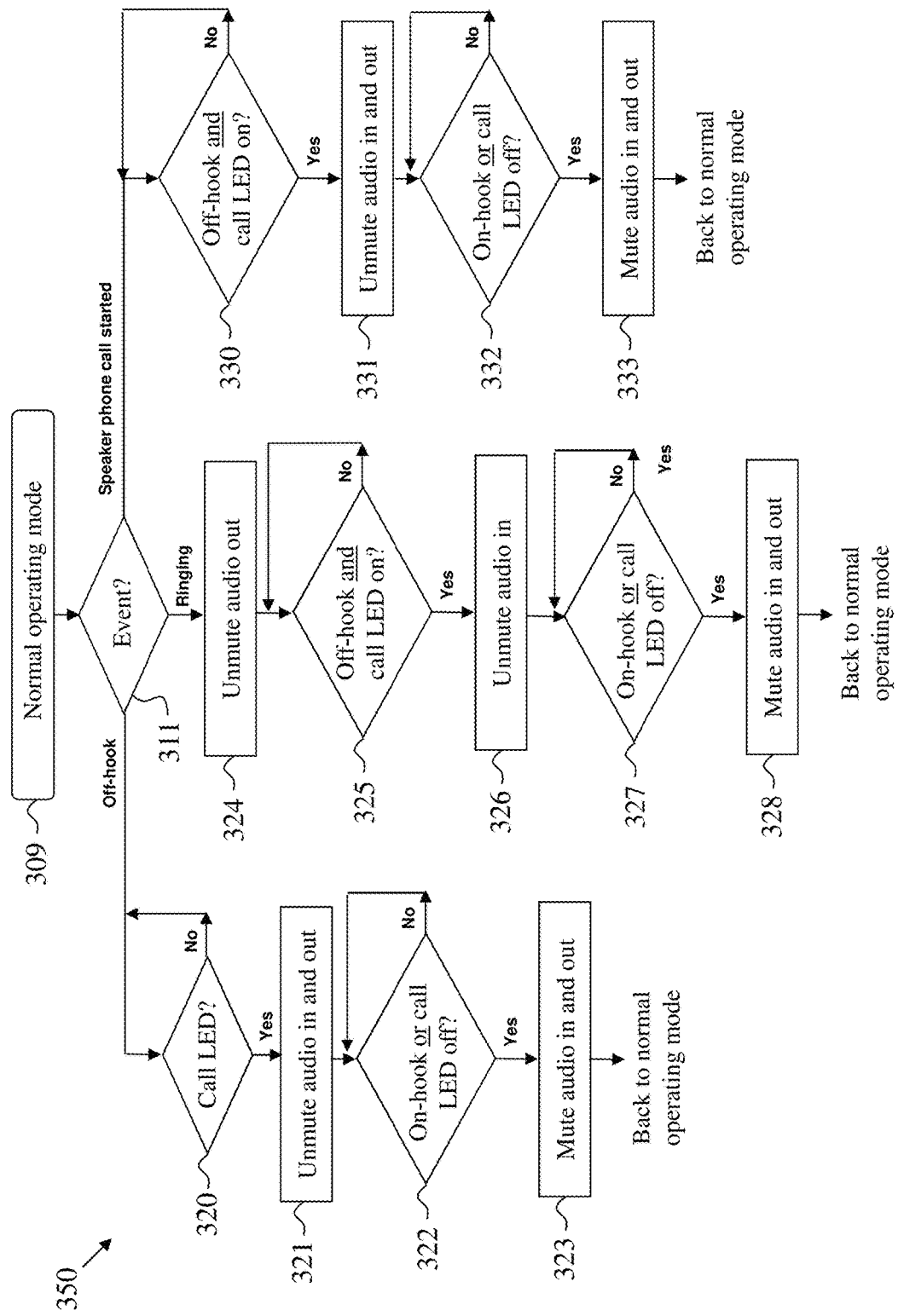
FIG. 5B schematically illustrates a high-level block diagram of a method of operation, of a VoIP phone device while it is in Normal Operating mode, known in the art.

FIG. 5B schematically illustrates a high-level block diagram of a method 350 of operation of a VoIP phone device 100 while it is in Normal Operating mode.

While in normal operation mode 309, device 100 performs the following:

In step 311 the security microcontroller is waiting for an event.

The following events may be detected by the security microcontroller 72x:

The user removed the handset and the hook switch 18 is off-hook;

The phone is ringing; or

The user initiated a speaker-phone call by pressing the appropriate phone button.

It should be noted that the fourth event—tempering detected is already covered in FIG. 5A and therefore it is not shown in this figure.

In the case that in step 311 security microcontroller 72*x* detected off-hook event, it will continue to step 320 to check if call LED is on. Detection of the off-hook event is starting with switch 18 being released by the handset removal. Then line 19*b* that is coupled to the security implant port D1 changes state. Implant port D1 is coupled to the security microcontroller 72*x* input port I1. Once it is on (call in progress LED detected by line 24*a* that is coupled to implant port D3 and then to security microcontroller input port 12) then in step 321 the security microcontroller will unmute both audio in and audio out through security microcontroller output ports O1 and O2 and lines 63 and 65, respectively. At the same time security microcontroller 72*x* will release the off-hook line connected to the phone microcontroller 10 through output port O3, implant port D2 and line 19*a*.

Then when on-hook state detected 322 through switch 18 (call disconnected by the user) or call LED is off (call disconnected by the other side) then security microcontroller 72*x* move to step 323 to mute both audio in and audio out through lines 63 and 65, respectively. At the same time security microcontroller 72*x* changes the state of the hook switch line 19*a* to signal the phone microcontroller 10 that the call should be terminated.

Then security microcontroller 72*x* then move back to Normal Operating mode in step 309 above and wait for the next event 311.

In the case that in step 311 security microcontroller 72*x* detected ringing event through line 24*a*, then it will move to step 324 to unmute audio out only through line 65. This will allow base speaker 35 to play the ringing tone or tune. If ringing terminated without answer (end of ringing LED indication captured by line 24*a*) then security microcontroller 72*x* will mute again the audio outputs through port O2 and line 65.

In the next step 325 the security microcontroller function 72*x* is waiting for two events (both events should happen)—off hook state detected by switch 18, and call LED is on. By sensing line 24*a* and line 19*b*. If both events are verified then security microcontroller 72*x* will move to step 326 to unmute audio inputs through line 63. This will allow the conversation to start as phone device will be able to use base microphone 37, handset microphone 27 or headset microphone to capture the user audio. Selection of which microphone(s) is (are) active during an active call, and/or which speaker(s) is (are) active during an active call is done within microcontroller 10, as is done in the non-secure VoIP device 100 of the art.

Then in the next step 327, if microcontroller function 72*x* detects that the off-hook switch 18 is on-hook (via line 19*b*) or if call LED is off (via line 24*a*), then it will move to step 328 below to mute both audio input and output through lines 63 and 65, respectively.

Then security microcontroller 72*x* then move back to Normal Operating mode in step 309 above and wait for the next event.

In the case that in step 311 security microcontroller 72*x* detected that speaker phone conversation started by sensing call LED line 24*a* activity while hook switch 18 is on-hook (via line 19*b*), it will then move to step 330 below.

In the next step 330 the security microcontroller function 72*x* is waiting for two events (both events should happen)—off hook state detected by switch 18, and call LED is "On" (by sensing line 24*a*, and line 19*b*). If both events are verified then security microcontroller 72*x* will move to step 331 to unmute audio inputs through line 63. This will allow the conversation to start as phone device will be able to use base microphone 37, handset microphone 27 or headset microphone to capture the user audio.

It should be noted that while using a secure, the operator must remove the handset from the phone whenever a call is active (including when speaker phone call is active). This will remind the user that there is an active call and maintain the audio inputs and outputs in active state.

Then in the next step 332, if microcontroller function 72*x* detects that the off-hook switch 18 is on-hook or if call LED is off, if so, then it will move to step 333 below to mute both audio input and output through lines 63 and 65 respectively and the call will be terminated.

Then security microcontroller 72*x* then move back to Normal Operating mode in step 309 above and wait for the next event.

It should be noted here that the security implant may manipulate the user indications based on its pre-programmed logic to assure that the indications provided are both usable and secure. It should be noted that this flow may be further modified to support specific phone behaviors and indications. In some embodiments the security microcontroller function 72*x* is programmed to detect abnormal on-of-hook switch activation patterns by measuring switch events timing. Pre-programed criteria for suspicious abnormal on-of-hook switch activation may be detected. Such detection may trigger a warning signal, for example a warning sound at the base speaker, and/or flashing indicator lights. Optionally, if such pattern is detected, persists or repeated, a tamper event is initiated.

As was disclosed in reference to FIG. 1, a VoIP phone may create a security risk by being susceptible to hacking such that it may be used for eavesdropping.

The apparatuses and methods disclosed in FIGS. 2 to 5B secure the VoIP phone system. However, in an office environment there may be two or more phones (simple or VoIP phones) in the same room. In such case, if a call is active in two (or more) phones concurrently, sensitive information may acoustically leak to unintentional listener creating a security risk. For example, a user may forget to disconnect a call, by setting the first phone in "on hook" state after the call had ended and accept or initiate a call on a second phone. The (still connected) first phone my then be used to eavesdropping of the conversation carried on over the second phone. The security risk is high in facilities were some of the phones are used for highly sensitive calls such as in law enforcement or government installations. In such installations, some phone may be "red phones" used for highly sensitive calls. Such phones may be equipped with voice encryption capabilities, and may be connected to a high security network. It can be appreciated that the possibility of inadvertent or intentional eavesdropping via a non-secure phone may create a security risk.

Modern sound analyses techniques may be used to enhance the leaked audio to extract conversation in a distant side of a room, or extract both sides of a conversation carried over a phone hand-set and not only over a speaker-phone.

So as to not clutter the text, a numeral followed by the letter "x" will refer to any of the letter that follow that numeral in the drawing, for example 696*x* can stand for any of phone 696*a*, 696*b*, 696R, etc.

FIG. 6A schematically illustrates a system 699 for mutually excluding call in plain phones 698B and 698R, in accordance with some exemplary embodiments of the disclosed subject matter.

In this exemplary embodiment, high security "red phone" 698R is connected to a high security "red network" 696R through a call sensor 695R. Low security "black phone" 698B is connected to a low security "black network" 696B through a switch 697B.

Phones 698x are a group of phones located in proximity to each other, for example in the same room 599 (not seen in the next figures), or even on the same desk, such that if both phones are concurrently active, conversation meant to be exclusively transmitted via one phone may be picked up by the other phone and be transmitted to an unauthorized person.

In its simplest form, call sensor 695R senses the status of red phone 698R by sensing the signals on phone line 694R. When call sensor 695R determine that red phone 698R is "off hook", such as a call is initiated or accepted by red phone 698R, it signals switch 697B via signaling line 693 to disconnect black phone 698B from black network 696B. If a call was underway in black phone 698B it is interrupted and terminated. Optionally, switch 697B is configured to be in a "normally disconnected" state, such that unless it receives "call enable" signal on signaling line 693 it disconnects black phone 698B from black network 696B. Thus, disconnecting call sensor 695R or signaling line 693 disables black phone 698B.

Filters within switch 697B and call sensor 695R prevents leakage of audio signals from one network to the other.

Optionally system 699 is installed within protective enclosure or in the wall, or as a part of the phone switchboard so it is difficult to disable its functionality by plugging black phone 698B directly to black network 696B bypassing switch 697B, or plugging red phone 698R directly to black network 696R bypassing call sensor 695R.

It should be noted that a symmetric system may be created where the two phones have the same priority and call-enable state is granted on "first-request" basis. In this case, switch 697B and are replaced with a "sensing-switching" device that includes both "call sensing" and "switching" functionality and signaling line 693 is bidirectional. Similarly, a system with more than two phones may be created wherein the sensing-switching devices are cascaded. For example, the signaling line may be held at "high" (that is, having some voltage on it), and the first sensing-switching device that detects "off hook" state at the phone connected to it, "pulls" the voltage to zero by grounding the signaling line, cases all other sensing-switching devices to disconnect their corresponding phone until the call ends, the phone state returns to "on hook", the signaling line returns to "high" and all phones are connected until another call is initiated or accepted.

It should be noted that networks 696x may stand for different phone lines in the same phone exchange system.

FIG. 6B schematically illustrates a system 689 for mutually excluding call in plain phones 698x, in accordance with some exemplary embodiments of the disclosed subject matter.

In this example, a plurality of phones 698x are each connected through a corresponding sensor-switch device 687x to the corresponding phone line or network 696x. Each sensor-switch device 687x is connected to the security unit 684 with a corresponding signaling cable 683x.

Security unit 684 ensures that a call may be active in only one of phones 696x at a time. Security unit 684 may be configured such that all phones 696x have the same priority, or one phone may be designated as having high priority, or arranged in some hierarchy such that a call initiated or received by higher priority phone terminates any call in progress in a lower priority phone. In some embodiments the security unit 684 has several jacks, each marked with the priority assigned to the phone connected to that jack with the corresponding signaling cable 683x.

In some embodiments, sensor-switch device 687x is normally in "secure state" when there is no call in progress, in which no audio signal may pass from the corresponding phone 696x to the corresponding phone line or network 696x. However, the corresponding phone 696x is powered such that its "on hook" or "off hook" state can be detected by the sensor-switch device 687x. Additionally, in this secure state, incoming call is detected by the sensor-switch device 687x. When the phone goes "off hook", or when incoming call is detected, the sensor-switch device 687x sends a "request" signal to the security unit 684 over the corresponding signaling cable 683x.

If the request is granted, the security unit 684 send an "enable" signal over the corresponding signaling cable 683x, and the sensor-switch device 687x changes its state to "call in progress". Additionally and optionally, security unit 684 send an "disable" signal over the other signaling cable 683x, setting all the other sensor-switch devices 687x in "disable state" where the other sensor-switch devices 687x disconnects the other phones from the other phone lines. When a sensor-switch devices 687x is in "disable state" the phone is disconnected, there is no dial tone so a call cannot be initiated. Optionally the phone would not ring if a call arrives. In some embodiments, a ring will sound, but the call cannot be answered. Optionally the ringing sound is altered to indicate that the call cannot be answered. Optionally, in a disabled state, a speaker at the sensor-switch device will sound when a call arrives while the phone is disconnected.

If the request is not granted, the security unit 684 does not send an "enable" signal over the corresponding signaling cable 683x, and the sensor-switch device 687x remains in "secure state".

Once the call ends and the phone state returns to "on hook", the sensor-switch device 687x sets all the sensor-switch device 687x back to "secure state".

In some embodiments of a system 689 for mutually excluding call, having at least one high priority phone, a call in progress in the high priority phone will set all lower priority phone in "disabled state". But a call in progress in the low priority phone will set all lower priority phone in "disabled state", and the high priority phone in "secure state". Thus, while a low priority call is in progress, a high priority phone may "highjack" the lines, termination the low priority call and commencing a high priority call.

FIG. 6C schematically illustrates a simple security unit 684S, in accordance with some exemplary embodiments of the disclosed subject matter.

In this example, security unit 684S is hosted within an enclosure 682. Optionally a tempering switch 45 enable detection of mechanical tampering attempt. Battery 46 powers the anti-tampering functionality when device is unpowered. Preferably, detection of tampering attempt permanently disables the simple security unit 684S.

Each signaling cable 683x includes three electrical signals, however few signals may be conducted by the same physical electrical wire: Power 681x, Call request status 680x, and Enable/Disable control 679x. In an exemplary embodiment of the invention, the signaling cable 683x may use standard communication protocol such as I2C, SPI, USB or the like.

Call request 680x is received by the corresponding optional receiver 677x and reported to logic 678 which according to its state (as defined above) operates all switches 675x to enable one and only one phone, and secure or disable all other phones. Low pass filters 674x (which may be a filter or a short delay) prevents audio signals from being transferred from one phone to the next.

In some embodiments, the power to elements associated with each phone are powered by that phone to decrease data and audio leak through the power lines. The logic 678 may be powered by one of the phones, by a battery, or by an external power supply.

FIG. 7A schematically illustrates a secure VoIP system 700, in accordance with some exemplary embodiments of the disclosed subject matter.

While the exemplary embodiments provided in FIGS. 6A-C can provide security to phone systems, the following embodiments adds at least one of few of the following advantages or characteristics:

These embodiments may work with VoIP phones.

In these embodiments the "sensor-switch" function is integrated within the VoIP phone.

In these embodiments the behavior and priority of the phones may be programmed.

In these embodiments, attempt to disconnect or tamper with any component causes the system to lock the phones.

So as not to clutter the figures, only some of identical elements are marked with a number.

Secure VoIP phone system 700 comprises a plurality of VoIP phones 600x, each equipped with an enhanced security implant similar to the security implants disclosed in FIGS. 2-5B above. The modification to the security implant allowed the VoIP phones 600x to interact with a Mutual Disabling Unit (MDU) 605 via corresponding command cables 603x. Command cables 603x are plugged into corresponding command ports 602x in VoIP phones 600x.

As will be disclosed below, MDU 605 enforces security rules such as blocking concurrent calls, setting priorities, etc. In some embodiments, all VoIP phones 600x are identical or comparable, and the priority hierarchy is programmed into them and into the MDU 605.

Each VoIP phone 600x is connected to a network 704x. Networks 704x may be the same network or several different networks. In some embodiments, a high security "red phone" 600r is connected to a high security network 704r. Optionally the red phone may have priority over the other (termed "black") lower security phones. In yet other embodiments the phones are grouped to priority groups each having one or more phones, wherein all the phones in a group share the same priority.

Additionally, other audio devices such as the audio input and output (for example a microphone, a speaker 705 and/or headset 706) of computer 707 may also be controlled by the MDU 605 using an audio isolator 708. This allows controlling audio or video conversation (e/g. using Skype, etc.). The audio isolator 708 disconnects the audio input and output from computer 707 in secured or disabled state. The audio isolator 708 may further comprise audio diode preventing using the output audio devices as microphones and optionally vise versa.

MDU 605 comprises a plurality of ports 709x for connecting command cables 603x. In some embodiments, ports 709x are identical and their priority is optionally programmed. In other embodiments, one or few ports, for example high security port 709r have a predefined priority.

A programming unit 710. For example, a PDA, laptop, mobile phone, tablet or proprietary computing device may be connected to configuration port 655 and used for programming or reprogramming the MDU 605 and/or phones 600x. Alternatively, the MDU 605 and/or phones 600x are programmed at manufacturing and cannot be re-programmed. Optionally, the programming unit 710 logs programming activities to a security server 720. Optionally, the MDU 605 logs calling activities to a security server 720. In this case the security server 720 optionally monitors the calling activity and may optionally alert security personnel, and/or disable the MDU 605 if abnormal activity is detected.

Optionally, MDU 605 is equipped with status display 712, for example a multicolor LED lamp, or a graphical or alphanumeric display.

In some embodiments, the MDU 605 and each phone 600x and audio isolator 708 has a unique ID embedded in manufacturing or programmed into it. During installation of secure VoIP system 700, the components are paired such that removing, adding or replacing a component in the system causes the system to prevent any calling activity. In some embodiments the system re-gain normal activity when the components are reconnected correctly. In other embodiments the system "freezes" and had to be unlocked or re-installed. Paring may be set and/or reset by programming unit 710 (termed also programming and pairing unit), or may be programmed at manufacturing.

Specifically, when the system used only two phones, these phones may be sold as a pair, optionally with one having pre-defined high priority. In this case, the MDU functionality may be embedded in the two phones.

FIG. 7B schematically illustrates a rear-view of a VoIP phone 600 with cover removed to expose the internal physical layout, showing the additional command port 602, in accordance with some exemplary embodiments of the disclosed subject matter.

FIG. 7B is similar to FIG. 4B, and thus markings were removed as to not clutter the figure. Also marked in the figure is modular handset jack 29, which is used for both connecting the hand set during normal operation and programming the modified implant 20ea. It should be notes that this layout is to be viewed as non-limiting example. Other VoIP phones types may be used with a different look. Optionally, an additional separate jack may be used for programming the modified implant 20ea. Optionally, the command ports 602 may be used for programming the modified implant 20ea. Optionally, the modified implant 20ea may not be programmable. Optionally, the functionality of modified implant 20ea may be integrated within the motherboard of VoIP phone 600. Command port 602 is typically a modular jack.

Figure 8A:
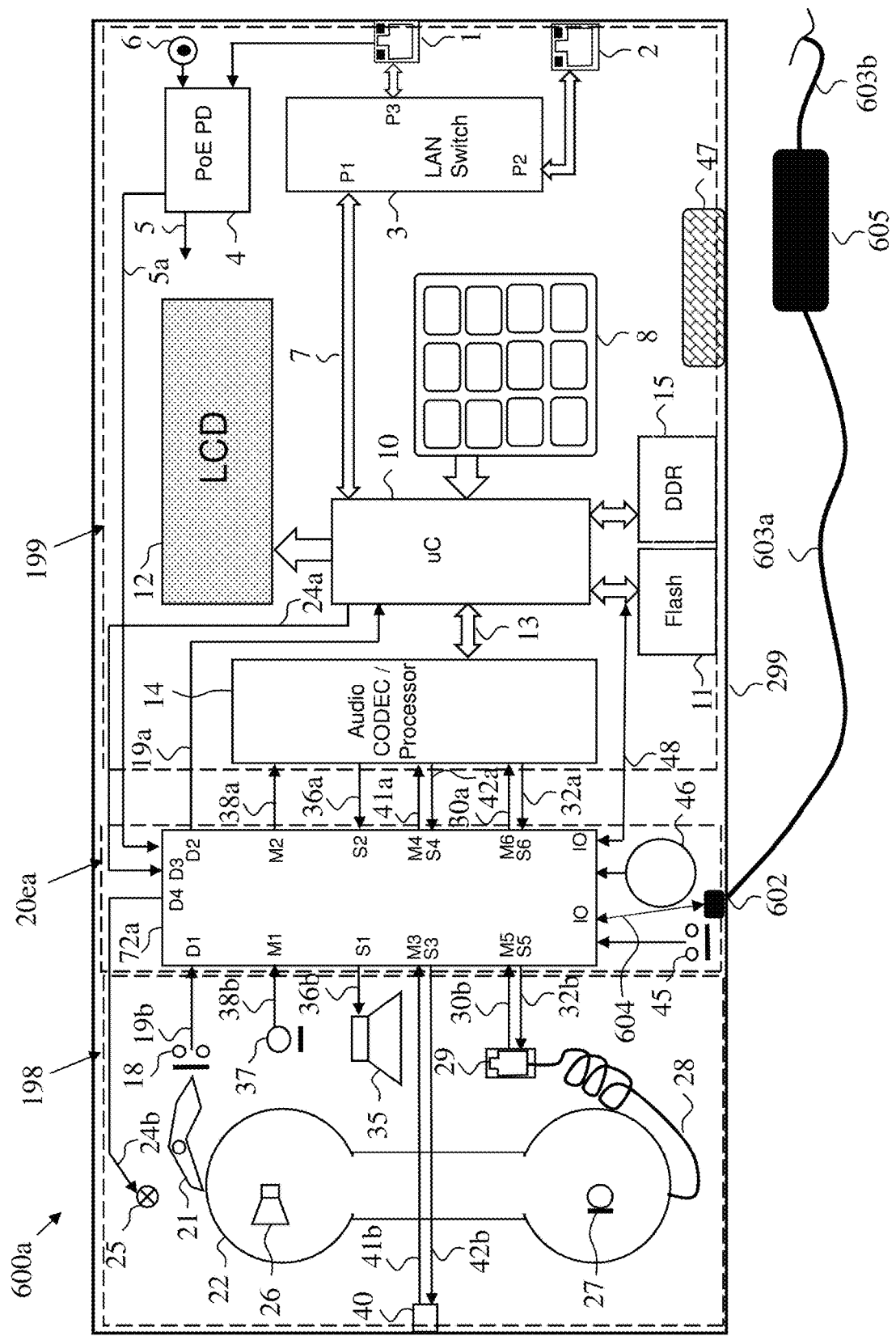
FIG. 8A schematically illustrates a block diagram of a VoIP phone with enhanced security implant, showing the additional command ports, in accordance with some exemplary embodiments of the disclosed subject matter.

FIG. 8A schematically illustrates a block diagram of a VoIP phone 600 with enhanced security implant 20ea, showing the additional command ports 602, in accordance with some exemplary embodiments of the disclosed subject matter.

FIG. 8A is a modification of FIG. 2 of the prior art above, thus only the security enhancements are detailed herein.

A first VoIP phone 600a with enhanced security implant 20ea is having an additional command port 602 connected to the IO port of security microcontroller 72a via channel 604. Command cable 603a connects the first VoIP phone 600a with MDU 605. MDU 605 is connected to at least one second VoIP phone with enhanced security implant (not seen here) by a second command cable 603b.

Figure 8B:
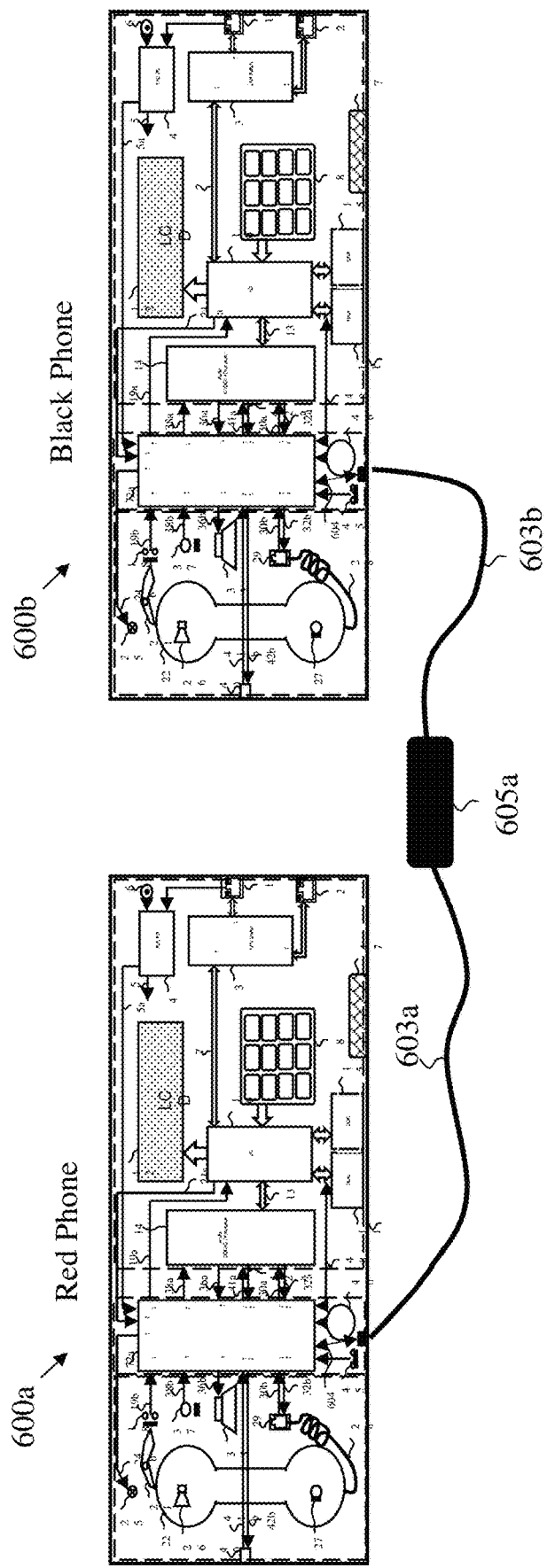
FIG. 8B schematically illustrates two VoIP phones, each with enhanced security implant, connected via command lines and MDU dongle, in accordance with some exemplary embodiments of the disclosed subject matter.

FIG. 8B schematically illustrates two VoIP phones 600a and 600b, each with enhanced security implant, connected via command lines 603a and 603b and MDU dongle 605a, in accordance with some exemplary embodiments of the disclosed subject matter.

In this simple example, the logic within MDU dongle 605a may be similar to the one seen in FIG. 6C. Alternatively, MDU dongle 605*a* may be used to restrict the frequency of signals going across and to sync between the two VoIP phones 600*a* and 600*b*. Alternatively, MDU dongle 605*a* be eliminated and only one cable may connect the two VoIP phones.

In some embodiments, security microcontrollers 72*a* in the two VoIP phones 600*a* and 600*b* communicate for example using single I/O SWD protocol (half-duplex), or any other bi-directional protocol, to send requests, get grants and optionally authenticate in front of the MDU. Optionally, a single wire is used for this type of communication.

In some embodiments, a "red phone" and a "black phone" are supplied as a pair, already programmed, each with its priority preset. Optionally the pair is pre-programmed to authenticate only each other. Optionally, MDU 605*a* is then redundant and is replaced with a cable. Optionally red and black phones are supplied already marked with their priority, for example having red and black color, or red and black label.

Figure 8C:
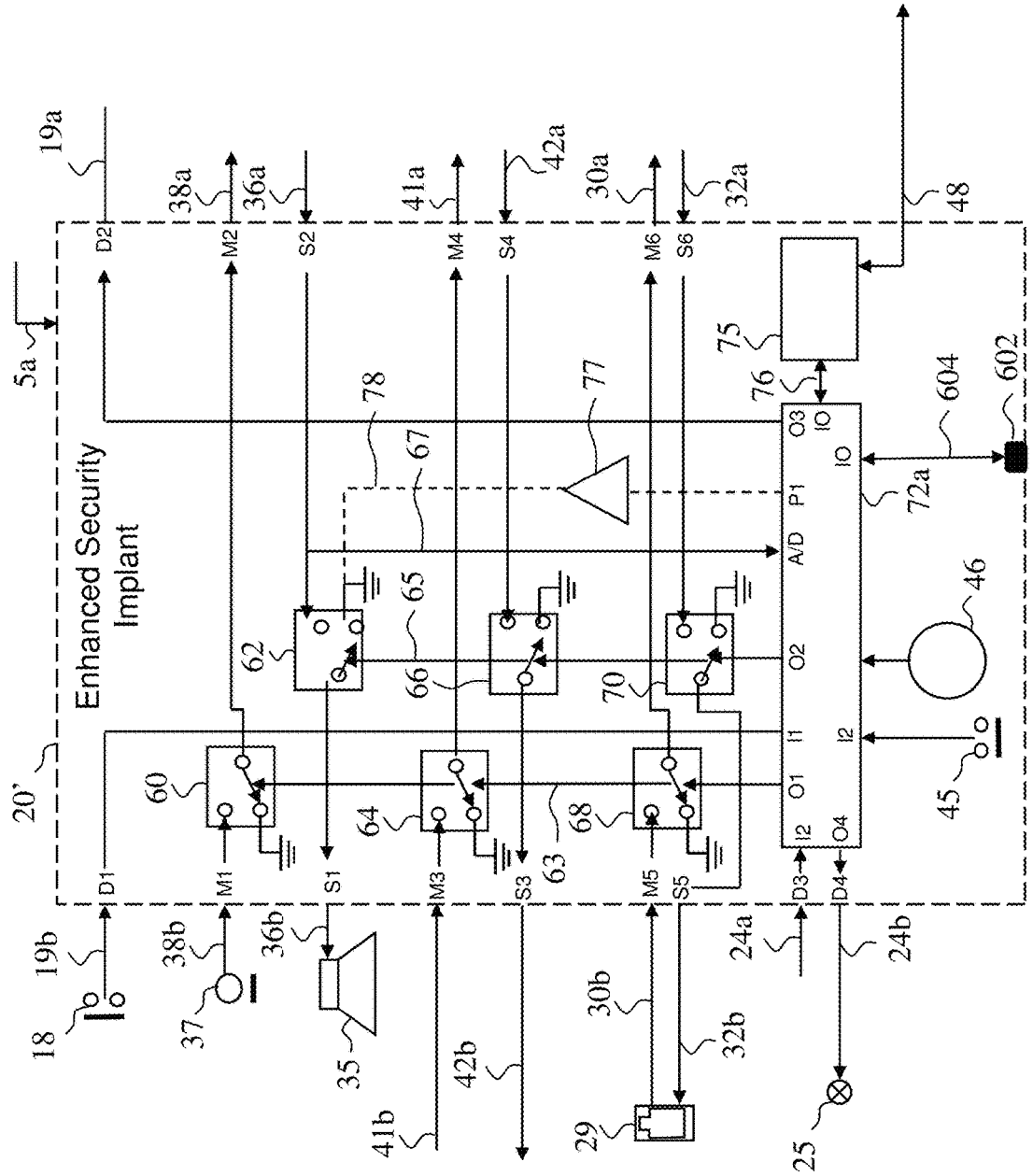
FIG. 8C schematically illustrates a block diagram of an enhanced security implant, showing the additional command ports, in accordance with some exemplary embodiments of the disclosed subject matter.

FIG. 8C schematically illustrates a block diagram of an enhanced security implant 20', showing the additional command ports 602, in accordance with some exemplary embodiments of the disclosed subject matter.

FIG. 8C is a modification of FIG. 3A of the prior art above, thus only the security enhancements are detailed herein.

Enhanced security implant 20' is having an additional command port 602 connected to the IO port of security microcontroller 72*a* via channel 604.

Figure 8D:
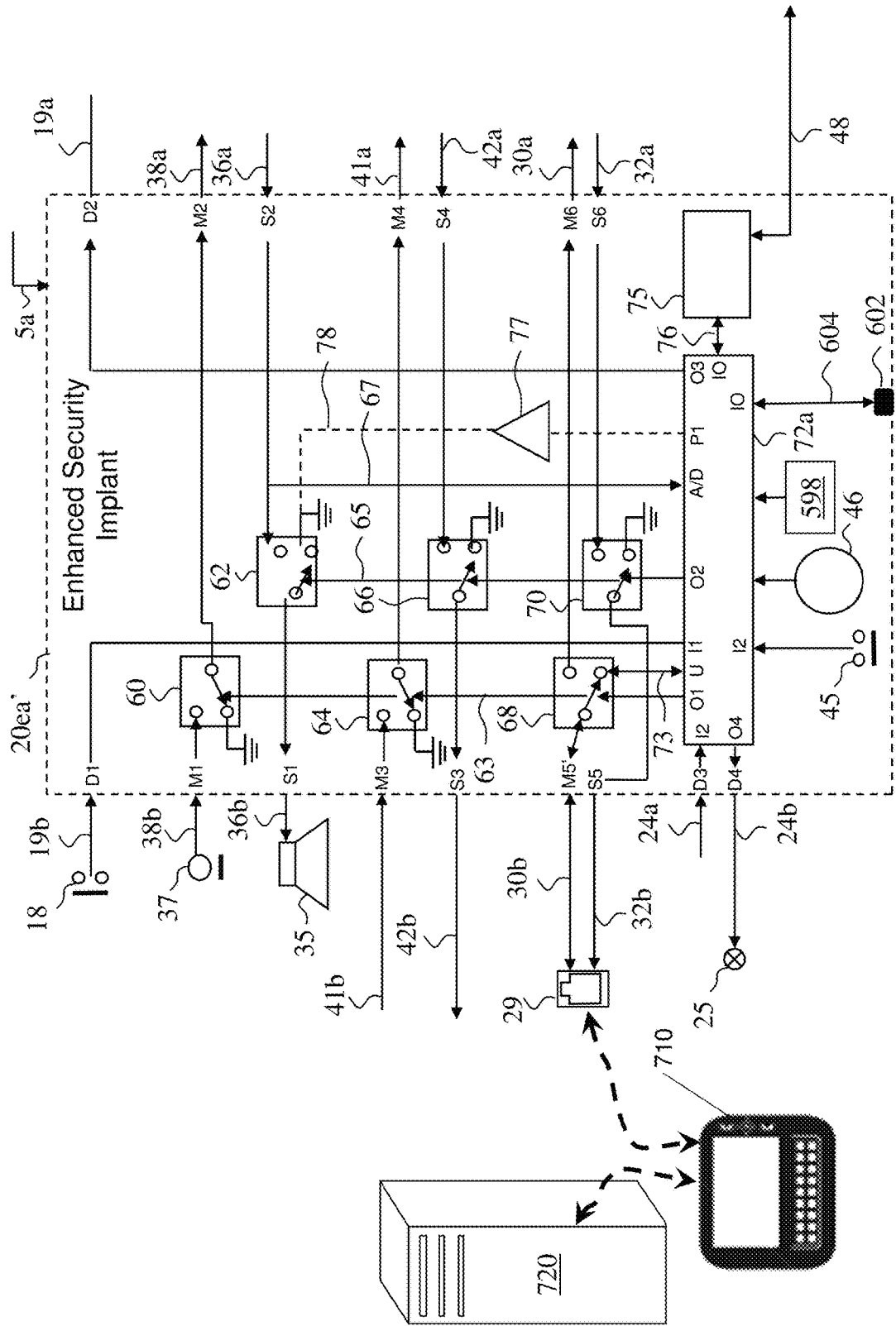
FIG. 8D schematically illustrates a block diagram of an enhanced configurable security implant, showing the additional command ports, in accordance with some exemplary embodiments of the disclosed subject matter.

FIG. 8D schematically illustrates a block diagram of an enhanced configurable security implant 20*ea*', showing the additional command ports 602, in accordance with some exemplary embodiments of the disclosed subject matter.

FIG. 8D is a modification of FIG. 3B of the prior art above, thus only the security enhancements are detailed herein.

Enhanced configurable security implant 20*ea*' is having an additional command port 602 connected to the IO port of security microcontroller 72*a* via channel 604. Seen in this figure is the programming unit 710 connected via handset jack 29. Programming unit 710 optionally logs programming activities to a security server 720.

Configuring enhanced configurable security implant 20*ea*' may include inputting ID or key required for the security implant to authenticate in front of the MDU unit or in front of another enhanced configurable security implant 20*ea*'. Programming unit 710 or security server 720 may have a table of such ID or keys that are loaded to the configurable security implants 20*x*' during installation process.

Optionally, additionally or alternatively, each security implants 20*x*' may have a hard-coded ID 598 embedded during manufacturing. In this case, the ID code is read by programming unit 710, and then loaded into the MDU such that it can authenticate and pair with the security implant.

Figure 8E:
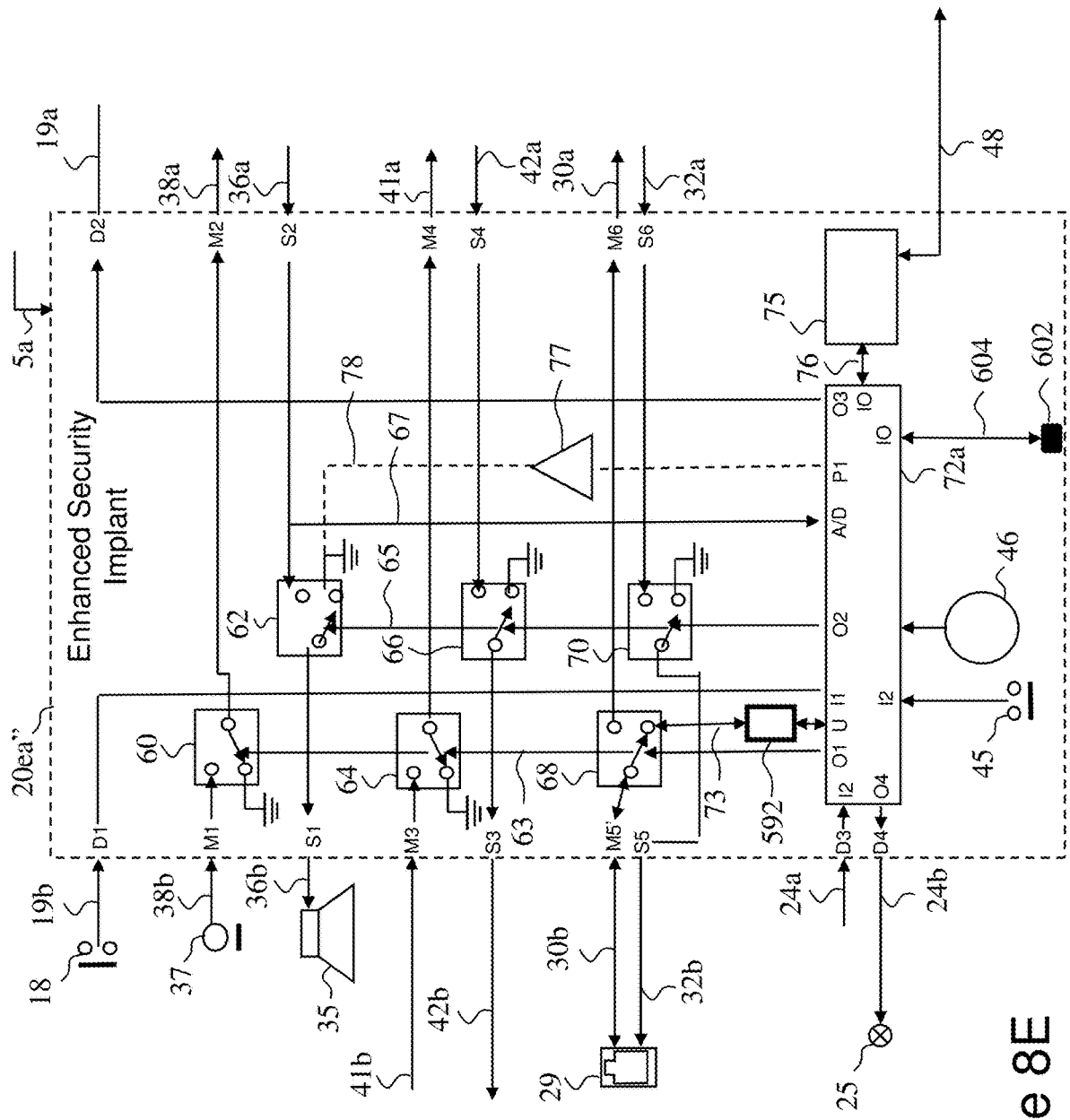
FIG. 8E schematically illustrates a block diagram of an enhanced configurable security implant, showing a USB controller, in accordance with some exemplary embodiments of the disclosed subject matter.

FIG. 8E schematically illustrates a block diagram of an enhanced configurable security implant 20*ea*", showing a USB controller 592, in accordance with some exemplary embodiments of the disclosed subject matter.

FIG. 8E is a modification of FIG. 8D above, thus only the differences are detailed herein.

Enhanced configurable security implant 20*ea*" is having a USB controller 592, connected between the U port of security microcontroller 72*a* and the third analog switch 68 for convenient communication with programmer 170.

Figure 8F:
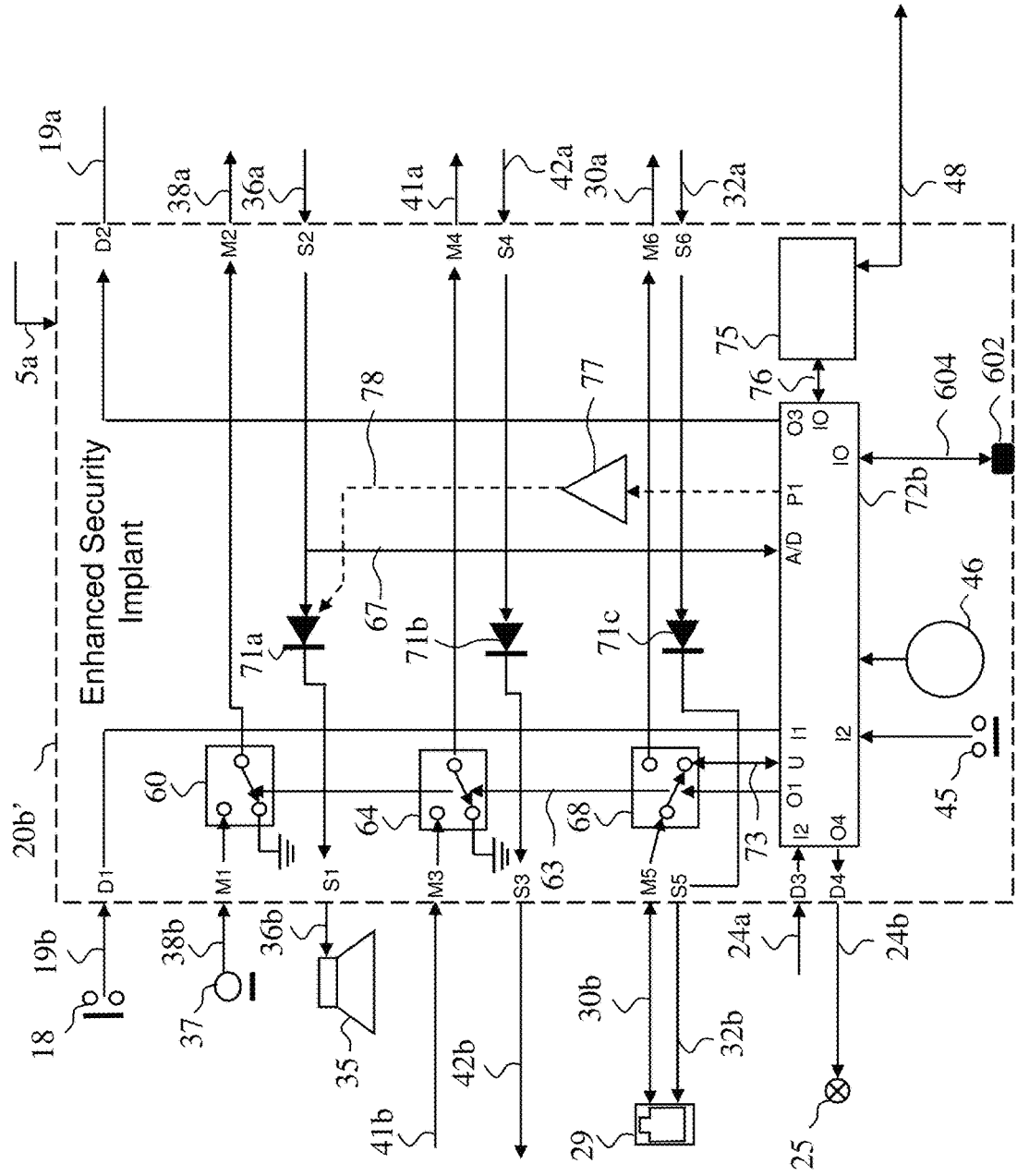
FIG. 8F schematically illustrates a block diagram of an enhanced security implant showing additional command ports, in accordance with some exemplary embodiments of the disclosed subject matter.

FIG. 8F schematically illustrates a block diagram of an enhanced security implant 20*b*', showing the additional command ports 602, in accordance with some exemplary embodiments of the disclosed subject matter.

FIG. 8F is a modification of FIG. 3D of the prior art above, thus only the security enhancements are detailed herein.

Enhanced security implant 20*b*' is having an additional command port 602 connected to the IO port of security microcontroller 72*a* via channel 604.

In an exemplary embodiment of the invention, upon receiving a command through command port 602, security microcontroller 72*x* may disable all audio channels, additionally, security microcontroller 72*x* may disable ringing. Additionally or alternatively, MDU 605 creates busy state at the other phones to prevent calls from ringing.

FIG. 9 schematically illustrates a block diagram of MDU 605, in accordance with some exemplary embodiments of the disclosed subject matter.

In this embodiment, MDU 605 details (disclosure below) may also be applied to MDU 605*a*, security logic 684 and security logic 684S, and each may be substituted by MDU 605. Security logic 684 and security logic 684S may also be referred to as an MDU. Similarly, MDU 605 may interact with audio devices such as VoIP phones 600*x*, audio isolators 708 and switches 697*x*, and the disclosure below may also be applied to all relevant such devices. MDU 605 is seen in FIG. 9 with three ports 709*a* to 709*c*, however, as seen in the figures above, number of ports 709*x* may be two or any other number. At least two, but not all the ports need to be connected to a corresponding VoIP phone.

Each port 709*x* receives power 648*x* from the corresponding connected VoIP phone which is optionally used for powering a corresponding optional transceiver 651*x* comprising a receiver 650 and transmitter 649. A first port 709*a* provides power to the security logic 654 through optional isolator 652. This optional powering arrangement reduces the risk of data leaks and interference via the power lines.

Security logic 654 may be programmed during manufacturing, or may be programmed or re-programmed by connecting the programming unit 710 to paring controller jack 655. Such programming may comprise: setting priority to each port 709*x*; Loading ID or keys of the enhanced security VoIP phone 600*x* to be connected to and authenticated by the MDU 605; Designating each port 709*x* to a specific VoIP phone 600*x*; and other parameters and operational rules.

MDU 605 may be loaded during the programming stage with an ID or keys to be used for authentication in front of the connected VoIP phones 600*x*. Optionally, additionally, or alternatively, MDU 605 may comprise an ID or key 653, embedded during manufacturing to be used for authentication in front of the connected VoIP phones 600*x*.

Security logic 654 may be a microcontroller or CPLD or FPGA or combinations thereof.

In embodiments wherein MDU 605 is paired and authenticate in front of the audio devices it communicates with them using bidirectional communicational protocol. Such protocol, or sensors within the transceiver 651*x* may be used to ensure that no audio device is disconnected.

If any of the audio device is disconnected:
The MDU 605 enters a "secure all" state, terminating all calls in the audio devices connected to it, and refuse to grant any request until the audio device is reconnected.
Optionally, recovering from "secure all" state requires resetting the MDU 605.
Optionally, recovering from "secure all" state requires re-installing the system by repeating the programming and pairing process.

Optionally, recovering from "secure all" state require replacing the MDU 605 as it is permanently disabled if one of the audio devices is disconnected during normal operation.

In some embodiments, if cables 603x is disconnected, secure phone 600x (or other audio device as defined above) when properly configured and paired with MDU 506, will be enter a "disconnected state", terminating any call in progress, and disallow initiation or accepting new calls.

In some embodiments, if cables 603x is disconnected, secure phone 600x (or other audio device as defined above) when properly configured and paired with MDU 506, will permanently enter a "disconnected state", terminating any call in progress, and disallow initiation or accepting new calls.

Optionally, recovering an audio device from "disconnected state" state requires resetting the audio device.

Optionally, recovering from "disconnected state" state requires re-installing the audio device by repeating the programming and pairing process for the disconnected audio device.

Optionally, recovering from "disconnected state" state requires re-installing the entire system by repeating the programming and pairing process for the MDU and all the audio devices.

This is done to prevent a situation that the user will advertently or inadvertently disconnect this security function. It may also prevent security vulnerabilities in the case of MDU failure.

In some embodiments, MDU 605 uses separate signaling lines for receiving requests from, and/or granting requests to audio devices such as VoIP phones 600x, audio isolators 708 and switches 697x, and uses a bidirectional protocol for authentication and paring.

Optionally a tempering switch 45 enable detection of mechanical tampering attempt. Battery 46 powers the anti-tampering functionality when device is unpowered. Preferably, detection of tampering attempt permanently disables MDU 605. Battery 46 may also be used to maintain the status of "secure all" during power down of the system. Optionally a tampering Evident Label 47 is strategically located on the MDU 506.

In an exemplary embodiment of the invention, if one of the VoIP phones is powered down, the pairing with the MDU is disconnected and the system "freezes". Alternatively, the pairing with the MDU is re-established in a "power-up" process, or "re-activation" process.

FIG. 10A illustrates a MDU and audio devices pairing process, in accordance with some exemplary embodiments of the disclosed subject matter.

This simple process applies for example to MDU have priority preset to each of its connectors, such that programming is not needed.

For example, in a "red" and "black" phone system seen in FIG. 8B.

In an exemplary embodiment, the MDU and audio devices pairing comprises the following steps:
1. Connect device No. 1 to Red MDU port. optional— device No. 1 identified and verified by the MDU.
2. Connect device No. 2 to Black MDU port. optional— device No. 2 identified and verified by the MDU.
3. Set MDU to operational state.

FIG. 10B illustrates an MDU and audio devices pairing and programming process, in accordance with some exemplary embodiments of the disclosed subject matter.

In an exemplary embodiment, the MDU and audio devices pairing and programming process comprises the following steps:
1. Connect MDU 605 to pairing and programming device 710. The MDU identified and verified by pairing device. ID or paring keys associated with MDU 605 are: loaded from the MDU 605 to pairing and programming device 710, or loaded from the pairing and programming device 710 to MDU 605.
2. Connect audio device No. 1 to MDU 605. Audio device No. 1 identified and verified by pairing device. ID or paring keys associated with Audio device No. 1 are: loaded from the MDU 605 to pairing and programming device 710, or loaded from the pairing and programming device 710 to audio device No. 1.
3. Pair device No. 1 with MDU 605. ID or paring keys associated with audio device No. 1 and MDU 605 are exchanged and are associated with each other such that audio device No. 1 and MDU 605 can recognize each other and can be authenticated by each other. Optional programming. Optionally: set priority to audio device No. 1 or associate audio device No. 1 with a priority group. This step set the calling rules associated audio device No. 1. In embodiments wherein MDU connectors have pre-defined priority, this step may be missing.
4. Connect audio device No. 1 with MDU 605. Audio device No. 1 and MDU 605 authenticate each other. Optionally, audio device No. 1 is associated with the specific connector in MDU 605 to which it is connected.
5. Disconnect audio device No. 1 from pairing and programming device 710.
6. Repeat #1-5 for all audio devices.
7. End paring: set MDU 605 to operational state.
8. Disconnect pairing and programming device 710 from MDU 506.
9. Optional—log a paring report on server 720.

It should be noted that the order of steps in the MDU and audio devices pairing and programming process may be changed and steps may be added or missing.

For example: pairing and programming device 710 may have only one connector and the paring process and step 1, 2 and 5 are modified accordingly. Alternatively, pairing and programming device 710 may have more than two connectors and may be connected to a plurality or to all the audio devices at once, and the paring process and step 1, 2 and 5 are modified accordingly. Similarly, the step of connecting the audio device to the MDU 506 may be performed at the start of the programming and paring process, and optionally for all audio devices associated with the same priority group, or for all the audio devices. Alternatively, the step of connecting the audio device to the MDU 506 may be performed at the end of the programming and paring process.

FIG. 11A schematically illustrates a flow chart 800 of the normal operation of an MDU having, in accordance with some exemplary embodiments of the disclosed subject matter.

The MDU acts as a state machine having rules that governs its behavior. Below is an example of such rules. The terms "phone" hereinbelow applies to any audio device.

The MDU continuously monitors 820 its ports 709 and periodically authenticates the connected audio devices. If paring is not established 821 in even one of the connected ports, the MUD disables all the connected devices, disables its operation and change the indication on the optional indicator 712 to "fault" status.

In this exemplary embodiment, when the MDU is in stand by state 801 no call is in progress. In this state, all the connected phones have their audio inputs and output disconnected. However, a call may be initiated by any of connected phone, and any of connected phone may detect an incoming call and optionally also ring when incoming call arrives. Optionally, the indicator 712 is showing a stand by status.

When a user is trying to initiate a call using an audio device (for example taking the phone off hook, or press the speaker phone button) or a, incoming call is arriving at one of the audio devices 802, that audio device sends a request to the MDU.

The MDU determine 803 the priority of the audio device, e.g., phone, sending the request. For example, there may be one or a group of a plurality of high priority "red" (R) phones and one or a group of a plurality of lower priority "black" (B) phones.

If the call request arrives from a red phone 804, the MDU enter a "red call" state:
- Disable all other connected phones. In this state, the other connected phones have their audio inputs and output disconnected, and additionally no call can be initiated or received by all other connected phones.
- Enables the red phone. In this state, the audio inputs and output of the red phone are connected, and additionally it can call out and accept a call.
- Changes the display indication to indicate the new status.
- When the call ended 805, the red phone releases the call request and the MDU returns to stand by state 801. In this state, all audio inputs and outputs of all the connected phones are disconnected 806.

If the call request arrives from a black phone 814, the MDU enters "black call" state:
- Enables the black phone. In this state, the audio inputs and output of the black phone are connected, and additionally it can call out and accept a call.
- Depending on the rules. Other black phones (if a plurality of black phones are connected) may optionally be capable of requesting a call, and be enabled while a call is ongoing in another black phone.
- Changes the display indication to indicate the new status.
- Audio inputs and outputs in the red phone are disconnected, but red phone may request a call.
- If a call request arrives 819 from a red phone, the MDU enters a red call state 804, terminating all black ongoing calls and granting the red phone request.
- When the call ended 815, the black phone releases the call request and the MDU returns to stand by state 801. In this state, all audio inputs and outputs of all the connected phones are disconnected 806.

The state diagram 800 may include other state(s) 824 such as granting request(s) from group "C".

For example, in a plant control room, having a plurality of workers, each with one or several phones, the red phone may be a high priority phone dedicated for safety related calls. Such call may need to be uninterrupted and available at all times. Additionally, such call may have highly sensitive information, not be heard, and not to be leaked to unauthorized ears.

Black phones may be dedicated to operation calls of lower priority and sensitivity. Optionally, several such call may be ongoing concurrently. However, such call should not be heard buy people outside the organization.

"C" phones may be assigned to personal calls of the workers needing to call their family members, or for handling their personal life etc. These unclassified calls should not be conducted while red or black calls are ongoing so as not to compromise the installation data security.

Figure 11B:
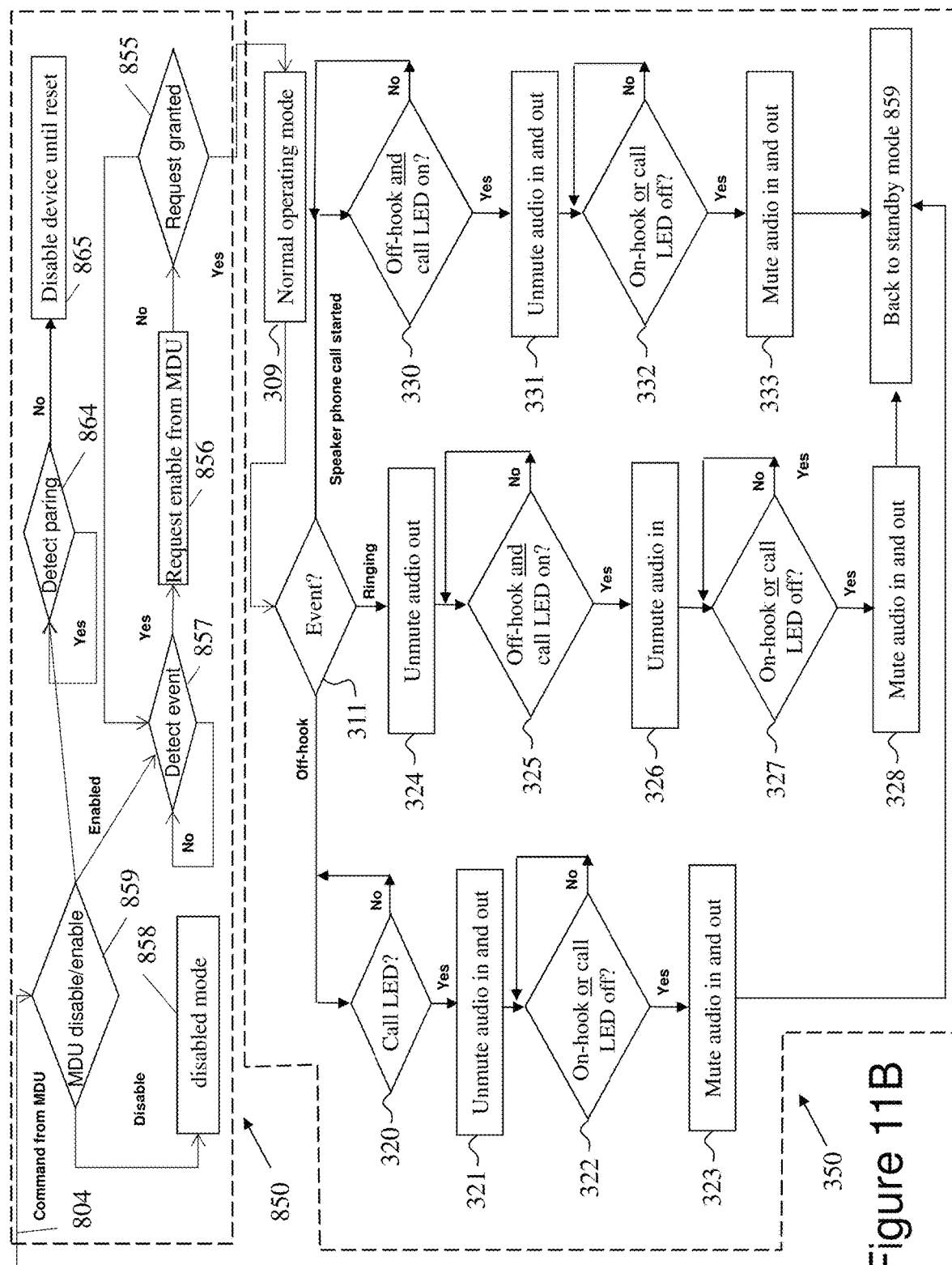
FIG. 11B schematically illustrates adaptation of high-level block diagram of a method of operation of a VoIP phone device while it is in normal operating mode, a, in accordance with some exemplary embodiments of the disclosed subject matter.

FIG. 11B schematically illustrates adaptation 850 of high-level block diagram of a method 350 of operation of a VoIP phone device 600x while it is in normal operating mode, in accordance with some exemplary embodiments of the disclosed subject matter. In addition to the security operation 350, the enhanced security operation 850 provides the following:

In standby mode 859, the phone enhanced security function continuously or periodically or before a call is to be initiated or accepted monitors 864 paring with MDU. If connection is interrupted or the MDU is not authenticated, the phone enters a disabled state 865 wherein its audio inputs and outputs remain disconnected and additionally calls cannot be initiated or accepted. Optionally, disabled state 865 remains even if the phone is reconnected to the MDU and the phone requires resetting to regain normal operation. Optionally the phone signals the MDU if it tampering was detected and causes the MDU to enter disabled state as well.

Additionally, the phone monitors 659 the command line from the MDU. MDU may cause the phone to enter a temporary disabled state 858 when another call with same or higher priority is ongoing. MDU may cause the phone to be disabled 856 if another phone was disconnected from the MDU. MDU may cause the phone to be disabled, optionally permanently, if another phone the MDU were tampered.

When the phone is not enabled, and if an event is detected 857 where the handset goes off hook or an incoming call is detected, the phone sends a call request 858 to the MDU. A call cannot be initiated or accepted unless the call request is granted by the MDU and the phone enters normal operation mode 309 according to the process 350 disclosed in FIG. 3B, with the exception that when the call ends or terminated by MDU command, the phone returns to standby mode 859.

Another security problem with current state of the art phones is that VoIP phones are typically connected to PCs directly or at the same LAN network. This means that IP phones may be abused by remote attacker to bridge the air-gap between "red" and "black" devices and network by using audio beeps generated by infected PC or an infected phone, converted to sound through audio output devices of that PC or phone, and received via the phone's microphone.

Having MDU prevents the malicious code in infected phones from using their audio transducers at the same time that the other phone is active.

It should be noted that the functions disclosed hereabove may use wireless connection to connect the phone with the MDU, for example Bluetooth, dedicated ISM radio, IR etc. Secure and encrypted wireless protocols are known but these options may be less secure and may cause risk of data leakages in areas that are highly classified.

While the above embodiment makes a security by deployed security hardware in each room, in an exemplary embodiment of the invention, similar approach may be implemented centrally in the level of the LAN switch, PSTN, or any other software or hardware that is located in the route of the organization network towards the VoIP phones. In this embodiment, the software or hardware hereinafter the Central Mutual Disable Unit, CMDU, monitors all the calls to the rooms. The CMSU hold a "map" of the rooms with "device designations" and the locations of all the VoIP phones. The CMDU have "call rules" to set its operation. For example, if in a specific room a black call is on going and a red call is started, the CMDU will drop off the black call. All other scenarios that are set in the call rules can be implemented. In some embodiments CMDU can implement hardware that will enforce unidirectional audio to prevent eavesdropping.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A secure phone system comprising:
a plurality of Voice over IP (VoIP) phones, each having an enhanced security implant device; and
a Mutual Disabling Unit (MDU) connected to each of said enhanced security implant devices in each of said VoIP phones,
wherein said enhanced security implant device is configured to
(a) detect at least one of an off-hook state and a call-in-progress state of the VoIP phone having the enhanced security implant device,
(b) report at least one of said detected states to the MDU, and
(c) disable a call operation of the VoIP phone having the enhanced security implant device by muting the audio or disconnecting a phone line of the VoIP phone, and
wherein said MDU is configured to instruct the enhanced security implant device of any of said VoIP phones to disable the call operation of the instructed VoIP phone responsive to receiving a report that another of said VoIP phones is in any of said states, in order to prevent audio eavesdropping.

2. The secure phone system of claim 1, wherein the MDU comprising a controller that is configured to pair and authenticate with the VoIP phones.

3. The secure phone system of claim 1, wherein the MDU comprising one of or any combination of (1) digital logic, (2) Complex Programmable Logic Device (CPLD), (3) Application Specific Integrated Circuit (ASIC), (4) Field-Programmable Gate Array (FPGA), (5) micro-controller, and (5) micro-processor.

4. The secure phone system of claim 1, wherein the MDU further comprising a tampering detector configured to detect attempt to tamper with the MDU, and permanently disabling the phones through said sensor-switch devices once a tampering attempt was detected.

5. The secure phone system of claim 1, wherein the VoIP phone comprises a base microphone and the security implant comprises an audio switch for connecting the base microphone to said VoIP phone's non-secure hardware only during active phone call.

6. The secure phone system of claim 1, wherein the VoIP phone comprises a base speaker, and the security implant comprises an audio switch to disable said base speaker when not in use.

7. The secure phone system of claim 1, wherein the VoIP phone comprises a handset microphone, and the security implant comprises an audio switch to disable the microphone in the handset when the handset off-on hook switch is in on-hook state.

8. The secure phone system of claim 1, wherein the VoIP phone comprises a handset speaker, and the security implant comprises an audio switch to disable said handset speaker when not in use.

9. The secure phone system of claim 1, wherein the security implant for a VoIP phone device comprises audio diodes between the audio amplifiers and speakers or earphones of the VoIP phone device to prevent audio eavesdropping through said speakers or earphones.

10. A secure phone system comprising:
a plurality of phones, each connected to a corresponding phone line through a sensor-switch device capable of:
sensing and reporting an off-hook state or a call-in-progress state on the corresponding phone, and
connecting and disconnecting the corresponding phone from said corresponding phone line; and
a Mutual Disabling Unit (MDU) connected to each of said sensor-switch device,
wherein said MDU is configured to instruct any of said sensor-switch devices to disconnect the corresponding phone from the corresponding phone line responsive to receiving a report from another of said sensor-switch device corresponding to another phone, in order to prevent audio eavesdropping.

11. The secure phone system of claim 10, wherein the MDU comprising one of or any combination of (1) digital logic, (2) Complex Programmable Logic Device (CPLD), (3) Application Specific Integrated Circuit (ASIC), (4) Field-Programmable Gate Array (FPGA), (5) micro-controller, and (5) micro-processor.

12. The secure phone system of claim 10, wherein the sensor-switch device transmits a call request status signal, and receives an enable/disable control signal.

13. The secure phone system of claim 10, wherein the MDU further comprising a tampering detector configured to detect attempt to tamper with the MDU, and permanently disabling the phones through said sensor-switch devices once a tampering attempt was detected.

14. The secure phone system of claim 10, wherein the MDU blocks concurrent calls in said plurality of phones.

15. A VoIP phone device for use in a secure phone system that comprises Mutual Disabling Unit (MDU), the VoIP phone device comprises a command port configured to be connected to the MDU, wherein upon receiving disable command over the command port, the VoIP phone mute the audio operations or disconnecting a phone line of the VoIP phone to prevent audio eavesdropping, and wherein the MDU is configured to instruct the VoIP phone, through the command port, responsive to receiving a report that another VoIP phone in the secure phone system is in at least one of an off-hook state and a call-in-progress state.

16. An enhanced security implant for a VoIP phone device for use in a secure phone system that comprises Mutual Disabling Unit (MDU), the enhanced security implant comprises a command port configured to be connected to the MDU, wherein upon receiving disable command over the command port, the implant for the VoIP phone force a mute of the audio operations or disconnecting a phone line of the VoIP phone to prevent audio eavesdropping, and wherein the MDU is configured to instruct the enhanced security implant, through the command port, responsive to receiving a report that another VoIP phone in the secure phone system is in at least one of an off-hook state and a call-in-progress state.

17. The enhanced security implant of claim 16, wherein the security implant for a VoIP phone device comprises an audio switch to disable at least one of or any combination of base microphone, base speaker, handset microphone and handset speaker.

18. The enhanced security implant of claim 16, wherein the security implant for a VoIP phone device comprises audio diodes between the audio amplifiers and speakers or earphones of the VoIP phone device to prevent audio eavesdropping through said speakers or earphones.

19. A method for securing a phone system comprising a group of phones, the group of phones is divided to subgroups of phones and each subgroup is assigned with a priority, the method comprises the steps:
1) Disable all phones;
2) Detect call request event in any one of said group of phones,
3) if no call is in progress in any other phone in the group of phones, enable the phone and disable all other phones in the group of phones;
4) If another call is in progress and the call request is associated to phone with higher priority, enable the higher priority phone and disable the lower priority phone;
5) Wait for call end; and
6) jump back to step 1),
wherein, enabling the phone allows the call and pass the audio operations and disabling the phone mute the audio operations to prevent audio eavesdropping.

20. A system for implementing the method of claim 19, wherein the system is deployed on the central call routing facility of an entity and the system manage a plurality of said group of phones comprising each a plurality of said subgroups of phones.

* * * * *